(12) United States Patent
Shiga

(10) Patent No.: US 7,992,705 B2
(45) Date of Patent: Aug. 9, 2011

(54) ROLLER UNIT AND CONVEYOR DEVICE

(75) Inventor: Hiroyuki Shiga, Tokyo (JP)

(73) Assignee: Hirata Corporation, Tokyo (JP)

( * ) Notice: Subject to any disclaimer, the term of this patent is extended or adjusted under 35 U.S.C. 154(b) by 121 days.

(21) Appl. No.: 12/521,181

(22) PCT Filed: Jun. 14, 2007

(86) PCT No.: PCT/JP2007/061977
§ 371 (c)(1),
(2), (4) Date: Jun. 25, 2009

(87) PCT Pub. No.: WO2008/152718
PCT Pub. Date: Dec. 18, 2008

(65) Prior Publication Data
US 2010/0006399 A1    Jan. 14, 2010

(51) Int. Cl.
*B65G 13/06*    (2006.01)
(52) U.S. Cl. .............................. 198/781.11; 198/781.07
(58) Field of Classification Search .................. 198/780, 198/781.01, 781.02, 781.03, 781.04, 781.07, 198/781.08, 781.09, 781.1, 781.11
See application file for complete search history.

(56) References Cited

U.S. PATENT DOCUMENTS

| | | | |
|---|---|---|---|
| 4,313,536 A | | 2/1982 | Fauth |
| 4,421,224 A | * | 12/1983 | Dingman ................. 198/781.02 |
| 4,993,541 A | | 2/1991 | Roh |
| 5,148,909 A | * | 9/1992 | Becker et al. .................. 198/780 |
| 5,372,247 A | * | 12/1994 | Nishikawa ..................... 198/780 |
| 5,878,869 A | * | 3/1999 | Wang ............................. 198/790 |
| 5,971,137 A | * | 10/1999 | Grant et al. ..................... 198/782 |
| 6,772,874 B2 | * | 8/2004 | Yamashita et al. ........ 198/781.03 |

FOREIGN PATENT DOCUMENTS

| | | |
|---|---|---|
| JP | 63-169517 | 11/1988 |
| JP | 1-299111 | 12/1989 |
| JP | 5-319527 | 12/1993 |
| JP | 10-310219 | 11/1998 |

OTHER PUBLICATIONS

International Search Report issued Sep. 18, 2007 in the International (PCT) Application of which the present application is the U.S. National Stage.

* cited by examiner

*Primary Examiner* — James R Bidwell
(74) *Attorney, Agent, or Firm* — Wenderoth, Lind & Ponack, L.L.P.

(57) ABSTRACT

A conveyor device is formed with roller units arranged continuously on conveyor frames (10, 10'). Each of the roller units includes a rotating body (110) having a cylindrical part (111) rotatably supported around a predetermined axis (A) and being rotationally driven, a roller (120) rotatably supported by an outer periphery of the cylindrical part to carry an object being conveyed on the outer peripheral surface thereof, a pair of thrust plates (140, 150) arranged so as to be capable of pressing both side surfaces of the roller while holding the roller therebetween and rotating integrally with the cylindrical part; and a pressing force adjusting mechanism (160, 170, 180, 190) arranged inside the cylindrical part to adjust a pressing force with which the paired thrust plates press the roller while holding the roller therebetween.

15 Claims, 19 Drawing Sheets

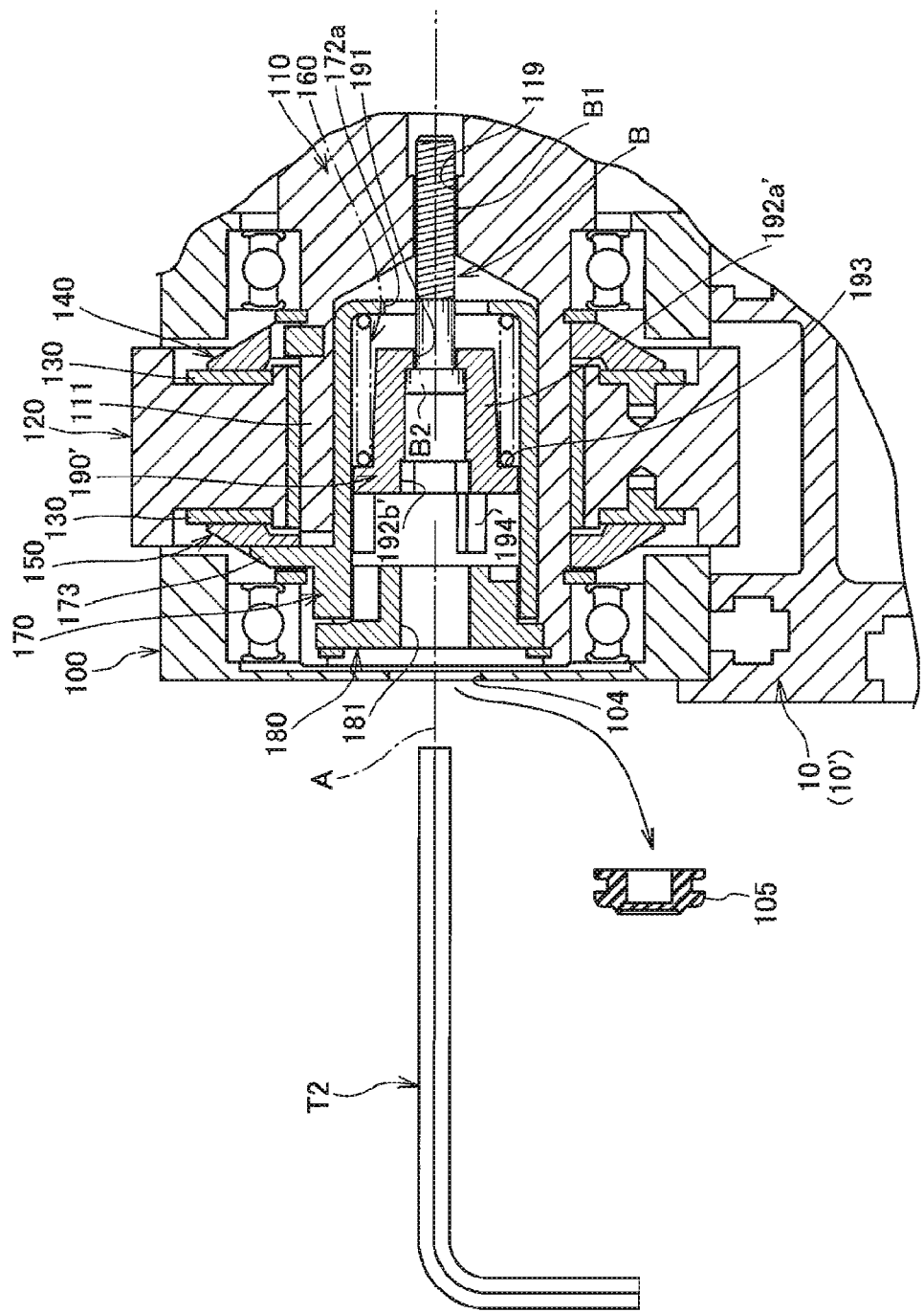

ROLLER UNIT AND CONVEYOR DEVICE

TECHNICAL FIELD

The present invention relates to a roller unit utilizing a frictional force, which is configured so that when a load applied by an object being conveyed is higher than the conveying force of a roller, the rotation of the roller stops, and when the load applied by the object being conveyed is lower than the conveying force thereof, the roller rotates to convey the object being conveyed, and a conveyor device equipped with this roller unit. More particularly, it relates to a roller unit capable of adjusting the conveying force (frictional force) arbitrarily and a conveyor device equipped with this roller unit.

BACKGROUND ART

As a conventional conveyor device, there has been known a conveyor device including, in order to convey an object being conveyed by an optimum conveying force according to the weight and the like of the object being conveyed, a shaft having frame mounting parts at both ends thereof; a thrust bearing fixedly installed at a position on an inside from the frame mounting part on one end side of the shaft; a stopper fixedly installed at a position on an inside from the frame mounting part on the other end side of the shaft; a roller element supported on the shaft so as to be slidable in an axial direction of the shaft between the thrust bearing and the stopper and rotatable in a circumferential direction; a sprocket supported so as to be rotatable in the circumferential direction of the shaft between the thrust bearing and the roller element; a friction transmitting means for frictionally transmitting a rotational driving force of the sprocket to the roller element between the roller element and the sprocket; and a pressing means arranged between the stopper and the roller element to press the roller element toward the sprocket.

In this conveyor device, the pressing means is formed by a first pressing element being in contact with the roller element; a second pressing element arranged inside from the stopper so as to face the first pressing element; an elastic element arranged between the first pressing element and the second pressing element to urge both the pressing elements so as to separate them from each other; and an adjusting nut for moving the second pressing element in the axial direction with respect to the stopper (for example, refer to Patent Document 1).

Also, as another conveyor device, there has been known a conveyor device including a main shaft having frame mounting parts at both ends thereof; two fixing nuts threadedly engaged to fix the main shaft to a frame at a position on an inside from the frame mounting part; a sprocket integrally having a cylindrical chain shaft, the movement of which to the outside is regulated by a snap ring arranged on an inside from one fixing nut and which is rotatably supported on the main shaft; a roller fitted at an outer periphery of the chain shaft via a collared bush; a plate washer arranged contactingly so as to sandwich the side surface of the roller in cooperation with the collar of the bush; a thrust bearing being in contact with the plate washer; a spring for urging the thrust bearing so as to press the plate washer on the side surface of the roller; and an adjusting nut threadedly engaged with the main shaft on an inside from the other fixing nut to adjust a compression amount of the spring (for example, refer to Patent Document 2).

However, the conveyor device described in Patent Document 1 has a construction such that the first pressing element, the elastic element, the second pressing element, the adjusting nut threadedly engaged with the external threads of the second pressing element, the stopper, and the like are arranged outside the roller element in the axial direction of the shaft, a tool such as a spanner is brought close to the shaft from the vertical direction and connected thereto to rotate the adjusting nut, and the second pressing element is pressed on the first pressing element, thereby adjusting the rotational force (that is, the conveying force) of the roller element. Also, the conveyor device described in Patent Document 2 has a construction such that the thrust bearing, the spring, the adjusting nut, and the like are arranged outside the roller and the sprocket (chain shaft) in the axial direction of the main shaft, a tool such as a spanner is brought close to the main shaft from the vertical direction and connected thereto to appropriately rotate the adjusting nut, and thereby the holding force (frictional force) with which the plate washer and the collar of the bush hold the roller therebetween, that is, the rotational force (conveying force) of the roller is adjusted.

Therefore, the size in the axial direction of the shaft (or the main shaft) increases, which makes the size of the device large in the width direction. Also, since the rotational force (conveying force) is adjusted by a screw system using the adjusting nut, if the tightening amount of adjusting nut varies when a plurality of roller elements (or rollers) are adjusted, the rotational force (conveying force) may vary among the roller elements (or rollers). Also, although a tool such as a torque wrench can be used to restrain the variations, such a tool is expensive, so that the use thereof leads to an increase in running and maintenance costs. Further, in the adjusting work using a tool such as a spanner, operation such that after the adjusting nut is turned through a fixed angle, the spanner is removed once, and fitted again to the adjusting nut to turn the adjusting nut must be repeated, which poses a problem in that the adjusting work is troublesome, and therefore the adjusting work requires much time.

Patent Document 1: Japanese Unexamined Patent Publication No. 10-310219
Patent Document 2: U.S. Pat. No. 4,993,541, Specification

SUMMARY OF INVENTION

Problem to be Solved by the Invention

The present invention has been made in view of the circumferences of the above-described conventional art, and accordingly an object thereof is to provide a roller unit that has versatility while attaining simplification of the structure, reduction in the size and running and maintenance costs, and the like; that can adjust the conveying force (rotational force) of roller by simple work without the occurrence of variations in conveying force among the rollers; that can adjust the conveying force appropriately so as to assist the conveying force due to a frictional force generated between a rotationally driven rotating body and the roller; and that can change the conveying force intentionally between the rollers, and is to provide a conveyor device equipped with this roller unit.

Means for Solving Problem

To achieve the above object, the present invention provides a roller unit for forming a roller-type conveyor device in which rollers are arranged continuously on a conveyor frame, including a rotating body that has a cylindrical part rotatably supported around a predetermined axis and is rotationally driven; a roller that is rotatably supported by an outer periphery of the cylindrical part to carry an object being conveyed on the outer peripheral surface thereof; a pair of thrust plates that is arranged so as to be capable of pressing both side surfaces of the roller while holding the roller therebetween and rotate integrally with the cylindrical part; and a pressing force adjusting mechanism that is arranged inside the cylindrical part to adjust a pressing force with which the paired thrust plates press the roller while holding the roller therebetween.

According to this configuration, the roller externally fitted to the cylindrical part of the rotating body is pressed by the paired thrust plates rotating integrally with the cylindrical part, and the pressing force is adjusted by the pressing force adjusting mechanism arranged inside the cylindrical part. By appropriately adjusting the pressing force (frictional force) by the pressing force adjusting mechanism, the level of the conveying force at which the state is switched over from the state in which the roller rotates integrally with the rotating body to the state in which the roller stops, the conveyance being stopped, and only the rotating body idles with the roller stopping can be set appropriately and easily according to the level of the load applied by the object being conveyed.

Since the pressing force adjusting mechanism is arranged inside the cylindrical part which is formed integrally with the rotating body and the outer periphery of which supports (externally fits) the roller, the size in the axis direction of the rotating body can be reduced, so that the roller unit can be made narrower in width and smaller in size. Therefore, the versatility for various types of conveyor devices can be increased.

The roller unit configured as described above can employ a configuration in which the pressing force adjusting mechanism includes a compression spring arranged in a state of capable of being compressed in the axis direction; a spring holder having a receiving part for receiving one end of the compression spring in a contacting state and a contact piece being in contact with one of the pair of thrust plates from the outside of the axis direction; a regulation holder that is arranged on the other end side of the compression spring in the axis direction and is fixed to the inside of the cylindrical part; and an adjuster that is arranged so as to be interposed between the compression spring and the regulation holder to adjust a compression amount of the compression spring by a rotational operation thereof from the outside of the axis direction.

According to this configuration, since the pressing force adjusting mechanism is formed by the compression spring, the spring holder having the receiving part for receiving one end of the compression spring and the contact piece, the regulation holder, and the adjuster only, simplification of the structure, and reduction in the size due to collection of parts can be attained.

Also, by bringing the contact piece into contact with one of the pair of thrust plates, inserting the compression spring in the spring holder so that one end thereof is seated against the receiving part, mounting the adjuster so as to press the other end of the compression spring, and mounting the regulation holder from the outside of the adjuster and fixing it to the cylindrical part, the pressing force adjusting mechanism can be assembled easily. By appropriately turning the adjuster from the outside of the axis direction, the compression amount of the compression spring is adjusted, by which the pressing force (that is, the conveying force of roller) with which the thrust plates press the side surfaces of the roller via the contact piece can be adjusted easily in a short period of time. Therefore, the maintenance and running costs involved in the adjusting work can be reduced.

The roller unit configured as described above can employ a configuration in which the adjuster is formed so as to be capable of adjusting a compression amount of the compression spring in a multistage manner according to the relative rotation angle with respect to the regulation holder.

According to this configuration, merely by turning the adjuster through a predetermined angle in relation to the regulation holder, the compression amount of the compression spring can be adjusted in a multistage manner. Therefore, as compared with the conventional case of simple screwing, the compression amount (conveying force) can be adjusted as desired with ease and high accuracy, and further with high accuracy without the occurrence of variations among the plurality of rollers.

For example, by forming the adjuster so that the position in the axis direction is specified by a plurality of level difference parts having different heights in the axis direction according to the rotation angle, simplification of the structure can be attained. Also, even an unskilled worker can easily set the compression amount corresponding to the level difference.

The roller unit configured as described above can employ a configuration in which the contact piece is provided in plural numbers at equal intervals in the circumferential direction so as to project in the radial direction with respect to the axis, and one of the pair of thrust plates is provided with a plurality of receiving grooves for receiving the plurality of contact pieces from the outside of the axis direction.

According to this configuration, since the plurality of contact pieces are provided evenly, the thrust plate can be pressed uniformly in the circumferential direction. Also, by fitting the contact pieces in the receiving grooves, the spring holder and the thrust plate can be rotated integrally. Also, the parts can be put together in the axis direction, and therefore the size in the axis direction can further be reduced, so that the roller unit can be made narrower in width and smaller in size.

The roller unit configured as described above can employ a configuration in which the rotating body is provided with internal threads in the axis direction; the regulation holder is provided with a through hole that allows the head and the shank of a bolt threadedly engaging with the internal threads to pass through; the adjuster is provided with a through hole that allows only the shank of the bolt to pass through; and the receiving part of the spring holder is provided with a through hole that allows at least the shank of the bolt to pass through.

According to this configuration, by inserting the bolt from the outside of the axis direction and screwing the external threads of the shank in the internal threads of the rotating body while the head thereof is in contact with the adjuster, the compression spring is further compressed exceeding the range of adjustment due to the rotation of the adjuster, so that the roller can be fixed compulsorily to the rotating body so as not to produce relative rotation between the roller and the rotating body.

The roller unit configured as described above can employ a configuration in which the adjuster has a connecting hole for insertingly connecting an adjusting tool from the outside of the axis direction, and a through hole that allows only the shank of the bolt to pass through at a position separating from the connecting hole by a predetermined distance toward an inside in the axis direction.

According to this configuration, in the state in which the bolt that fixes the roller compulsorily to the rotating body has been assembled beforehand in a state of not fixing compulsorily, (the tip end of) the adjusting tool is brought close to a unit frame from the outside of the axis direction, and is insertedly connected to the connecting hole of the adjuster. Thereafter, the tool is turned appropriately or pushed in through a predetermined length and turned, and then is pulled out, by which the adjuster can be adjusted easily.

Therefore, as compared with the case where the adjusting work is performed by using a spanner as in the conventional art, time and labor is saved, so that the adjusting work can be performed easily. Also, in the case where the roller is compulsorily fixed to the rotating body, merely by screwing the bolt having been assembled beforehand by using a general-purpose screwing tool, the roller fixing work can be completed.

The roller unit configured as described above can employ a configuration in which a cylindrical bush which rotates integrally with the roller and transmits a rotational force of the rotating body by means of a frictional force is provided between the cylindrical part of the rotating body and the roller.

According to this configuration, the roller is rotationally driven by a frictional force that is generated between the outer peripheral surface of the rotating body and the inner peripheral surface of the bush and depends on the load of the object being conveyed, by which a conveying force is generated. Since the frictional force on the side surface of the roller is appropriately adjusted by the pressing force adjusting mechanism, a higher conveying force can be obtained by assisting the conveying force due to the bush.

To achieve the above object, the present invention provides a conveyor device including a pair of conveyor frames extending in a direction in which an object being conveyed is conveyed; a plurality of roller units arranged along the pair of conveyor frames; a driving source for giving a driving force to at least one of the plurality of roller units; and a power transmitting member for transmitting the driving force of the driving source to the plurality of roller units. The roller unit includes a rotating body that has a cylindrical part rotatably supported around a predetermined axis and is rotationally driven; a roller that is rotatably supported by an outer periphery of the cylindrical part to carry an object being conveyed on the outer peripheral surface thereof; a pair of thrust plates that is arranged so as to be capable of pressing both side surfaces of the roller while holding the roller therebetween and rotate integrally with the cylindrical part; and a pressing force adjusting mechanism that is arranged inside the cylindrical part to adjust a pressing force with which the paired thrust plates press the roller while holding the roller therebetween.

According to this configuration, when the plurality of roller units are arranged along the paired conveyor frames, and at least one roller unit is rotationally driven by the driving source, the rotational driving force is transmitted other roller units via the power transmitting member, by which the object being conveyed carried on the rollers is transmitted along the paired conveyor frames.

The roller supported (externally fitted) on the cylindrical part of the rotating body is pressed by the pair of thrust plates rotating integrally with the cylindrical part, and the pressing force is adjusted by the pressing force adjusting mechanism arranged inside the cylindrical part. By appropriately adjusting the pressing force (frictional force) by the pressing force adjusting mechanism, the level of the conveying force at which the state is switched over from the state in which the roller rotates integrally with the rotating body to the state in which the roller stops, the conveyance being stopped, and only the rotating body idles with the roller stopping can be set appropriately and easily according to the level of the load applied by the object being conveyed.

Since the pressing force adjusting mechanism is arranged inside the cylindrical part which is formed integrally with the rotating body and the outer periphery of which supports (externally fits) the roller, the size in the axis direction of the rotating body can be reduced, so that the conveyor device can be made narrower in width and smaller in size.

The conveyor device configured as described above can employ a configuration in which the conveyor device has a unit frame which incorporates the plurality of roller units by dividing the roller units into a predetermined number, and the unit frame is arranged along the pair of conveyor frames and is installed detachably.

According to this configuration, since the predetermined number of roller units are incorporated in one unit frame and is modularized beforehand, by arranging and mounting the modularized unit frames on the conveyor frames, the conveyor device can be assembled. Therefore, ease and simplification of assembling work of the device as a whole and high accuracy of assembly can be attained.

The conveyor device configured as described above can employ a configuration in which the pressing force adjusting mechanism includes a compression spring arranged in a state of capable of being compressed in the axis direction; a spring holder having a receiving part for receiving one end of the compression spring in a contacting state and a contact piece being in contact with one of the pair of thrust plates from the outside of the axis direction; a regulation holder that is arranged on the other end side of the compression spring in the axis direction and is fixed to the inside of the cylindrical part; and an adjuster that is arranged so as to be interposed between the compression spring and the regulation holder to adjust a compression amount of the compression spring by a rotational operation thereof from the outside of the axis direction.

According to this configuration, since the pressing force adjusting mechanism is formed by the compression spring, the spring holder having the receiving part for receiving one end of the compression spring and the contact piece, the regulation holder, and the adjuster only, simplification of the structure, collection of parts, and reduction in the device size can be attained.

Also, by bringing the contact piece into contact with one of the pair of thrust plates, inserting the compression spring in the spring holder so that one end thereof is seated against the receiving part, mounting the adjuster so as to press the other end of the compression spring, and mounting the regulation holder from the outside of the adjuster and fixing it to the cylindrical part, the pressing force adjusting mechanism can be assembled easily. By appropriately turning the adjuster from the outside of the axis direction, the compression amount of the compression spring is adjusted, by which the pressing force (that is, the conveying force of roller) with which the thrust plates press the side surfaces of the roller via the contact piece can be adjusted easily in a short period of time. Therefore, the maintenance and running costs involved in the adjusting work can be reduced.

The conveyor device configured as described above can employ a configuration in which the adjuster is formed so as to be capable of adjusting a compression amount of the compression spring in a multistage manner according to the relative rotation angle with respect to the regulation holder.

According to this configuration, merely by turning the adjuster through a predetermined angle in relation to the regulation holder, the compression amount of the compression spring can be adjusted in a multistage manner. Therefore, as compared with the conventional case of simple screwing, the compression amount (conveying force) can be adjusted as desired with ease and high accuracy, and further with high accuracy without the occurrence of variations among the plurality of rollers.

For example, by forming the adjuster so that the position in the axis direction is specified by a plurality of level difference parts having different heights in the axis direction according to the rotation angle, simplification of the structure can be attained. Also, even an unskilled worker can easily set the compression amount corresponding to the level difference.

The conveyor device configured as described above can employ a configuration in which the contact piece is provided in plural numbers at equal intervals in the circumferential direction so as to project in the radial direction with respect to the axis, and one of the pair of thrust plates is provided with a plurality of receiving grooves for receiving the plurality of contact pieces from the outside of the axis direction.

According to this configuration, since the plurality of contact pieces are provided evenly, the thrust plate can be pressed uniformly in the circumferential direction. Also, by fitting the contact pieces in the receiving grooves, the spring holder and the thrust plate can be rotated integrally. Also, the parts can be put together in the axis direction, and therefore the size in the axis direction can further be reduced, so that the device can be made narrower in width and smaller in size.

The conveyor device configured as described above can employ a configuration in which the rotating body is provided with internal threads in the axis direction; the regulation holder is provided with a through hole that allows the head and the shank of a bolt threadedly engaging with the internal threads to pass through; the adjuster is provided with a through hole that allows only the shank of the bolt to pass through; and the receiving part of the spring holder is provided with a through hole that allows at least the shank of the bolt to pass through.

According to this configuration, by inserting the bolt from the outside of the axis direction and screwing the external threads of the shank in the internal threads of the rotating body while the head thereof is in contact with the adjuster, the compression spring is further compressed exceeding the range of adjustment due to the rotation of the adjuster, so that the roller can be fixed compulsorily to the rotating body so as not to produce relative rotation between the roller and the rotating body.

The conveyor device configured as described above can employ a configuration in which the adjuster has a connecting hole for insertingly connecting an adjusting tool from the outside of the axis direction, and a through hole that allows only the shank of the bolt to pass through at a position separating from the connecting hole through a predetermined distance to the inside of the axis direction.

According to this configuration, in the state in which the bolt that fixes the roller compulsorily to the rotating body has been assembled beforehand in a state of not fixing compulsorily, (the tip end of) the adjusting tool is brought close to the unit frame from the outside of the axis direction, and is insertedly connected to the connecting hole of the adjuster. Thereafter, the tool is turned appropriately or pushed in through a predetermined length and turned, and then is pulled out, by which the adjuster can be adjusted easily.

Therefore, as compared with the case where the adjusting work is performed by using a spanner as in the conventional art, time and labor is saved, so that the adjusting work can be performed easily. Also, in the case where the roller is compulsorily fixed to the rotating body, merely by screwing the bolt having been assembled beforehand by using a general-purpose screwing tool, the roller fixing work can be completed.

The conveyor device configured as described above can employ a configuration in which a cylindrical bush that rotates integrally with the roller and transmits a rotational force of the rotating body by means of a frictional force is provided between the cylindrical part of the rotating body and the roller.

According to this configuration, the roller is rotationally driven by a frictional force that is generated between the outer peripheral surface of the rotating body and the inner peripheral surface of the bush and depends on the load of the object being conveyed, by which a conveying force is generated. Since the frictional force on the side surface of the roller is appropriately adjusted by the pressing force adjusting mechanism, a higher conveying force can be obtained by assisting the conveying force due to the bush.

Advantageous Effect of the Invention

According to the roller unit and the conveyor device configured as described above, there can be obtained a roller unit that has versatility while attaining simplification of the structure, reduction in the size and running and maintenance costs, and the like; that can adjust the conveying force (rotational force) of roller by simple work without the occurrence of variations in conveying force among the rollers; that can adjust the conveying force appropriately so as to assist the conveying force due to a frictional force generated between a rotationally driven rotating body and the roller; and that can change the conveying force intentionally between the rollers, and a conveyor device equipped with this roller unit.

BRIEF DESCRIPTION OF DRAWINGS

FIG. 19 is a partial sectional view of a conveyor device, showing another embodiment of a roller unit in accordance with the present invention.

EXPLANATIONS OF LETTERS OR NUMERALS

Figure 1:
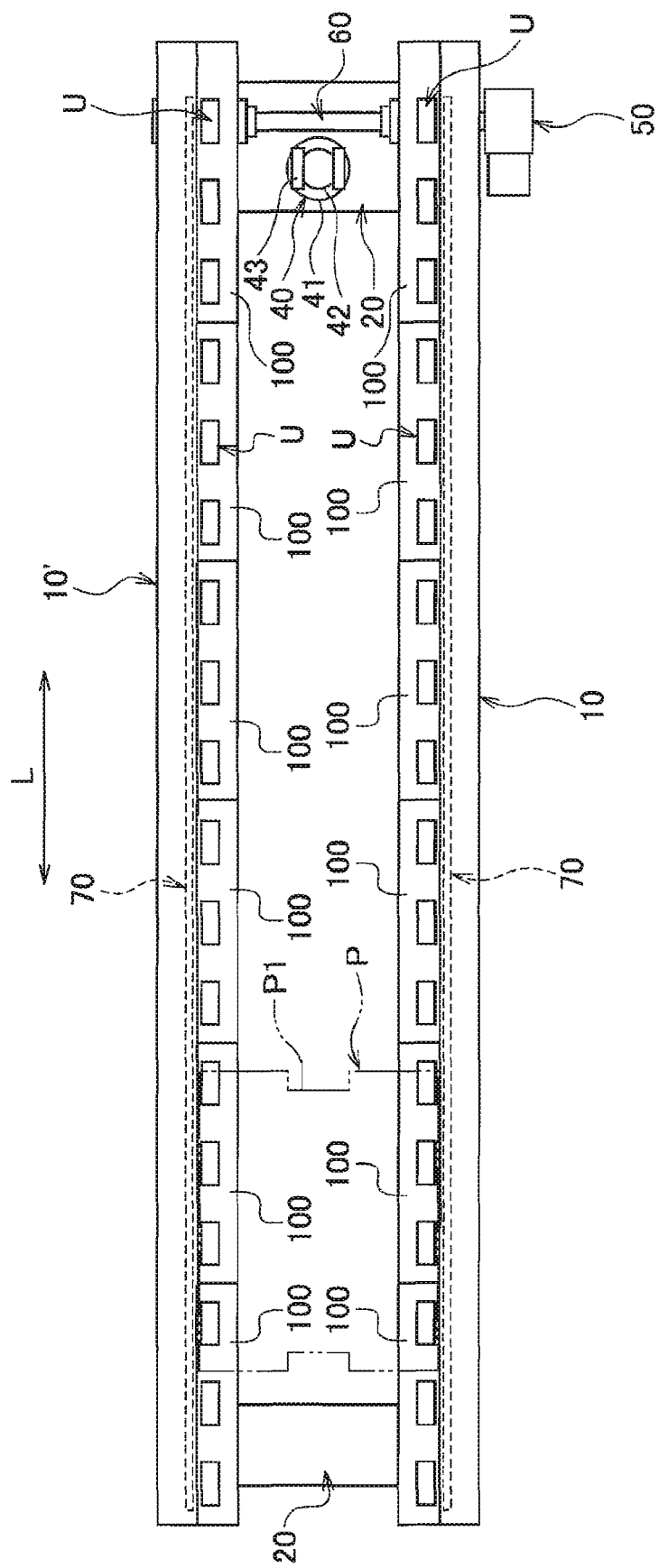
FIG. 1 is a plan view showing one embodiment of a conveyor device equipped with roller units in accordance with the present invention.

P . . . pallet (object being conveyed)
L . . . conveyance direction
T1 . . . adjusting tool
T2 . . . screwing tool (fixing tool)
B . . . bolt
B1 . . . shank
B2 . . . head
10, 10' . . . a pair of conveyor frames
11 . . . base part
12 . . . carrying part
13 . . . side wall part
14 . . . cover part
15 . . . lower holding member
16 . . . upper holding member
17 . . . guide member
20 . . . connecting frame
30 . . . leg part
40 . . . stopper mechanism
41 . . . elevating actuator
42 . . . elevating rod
43 . . . stopper member
50 . . . driving source
60 . . . connecting rod
70 . . . endless chain (power transmitting member)
100 . . . unit frame
101 . . . bearing
102 . . . circular opening
103 . . . rectangular opening
104 . . . adjustment hole
105 . . . lid
U . . . roller unit
110 . . . sprocket (rotating body)
110a . . . tooth row
111 . . . cylindrical part
A . . . axis
111a . . . annular groove
111b . . . key hole
112 . . . bush
113 . . . regulation ring
114 . . . key member
115 . . . slit
116 . . . inner peripheral surface
117 . . . expanded-diameter inner peripheral surface
117a . . . annular groove
118 . . . regulation ring
119 . . . internal thread
120 . . . roller
121 . . . inner peripheral surface
122 . . . outer peripheral surface
123 . . . side surface
124 . . . fitting hole
130 . . . friction plate
131 . . . protrusion
140 . . . first thrust plate (the other of a pair of thrust plates)
141 . . . through hole
142 . . . notch
143 . . . contact surface
144 . . . pressing surface
150 . . . second thrust plate (one of a pair of thrust plates)
151 . . . through hole
152 . . . receiving groove
153 . . . contact surface
154 . . . pressing surface
160 . . . compression spring (pressing force adjusting mechanism)
170 . . . spring holder (pressing force adjusting mechanism)
171 . . . bottomed cylindrical part
172 . . . bottom (receiving part)
172a . . . through hole
173 . . . contact piece
180 . . . regulation holder (pressing force adjusting mechanism)
181 . . . through hole
182 . . . cylindrical part
183 . . . concave part
183a . . . first concave part
183b . . . second concave part
183c . . . third concave part
183d . . . fourth concave part
184 . . . collar part
185 . . . protrusion
190, 190' . . . adjuster (pressing force adjusting mechanism)
191 . . . through hole
192 . . . connecting hole
192a' . . . tubular part
192b' . . . connecting hole
193 . . . receiving part
194 . . . engagement protrusion

DETAILED DESCRIPTION OF THE INVENTION

A best mode of the present invention will now be described with reference to the accompanying drawings.

Figure 2:
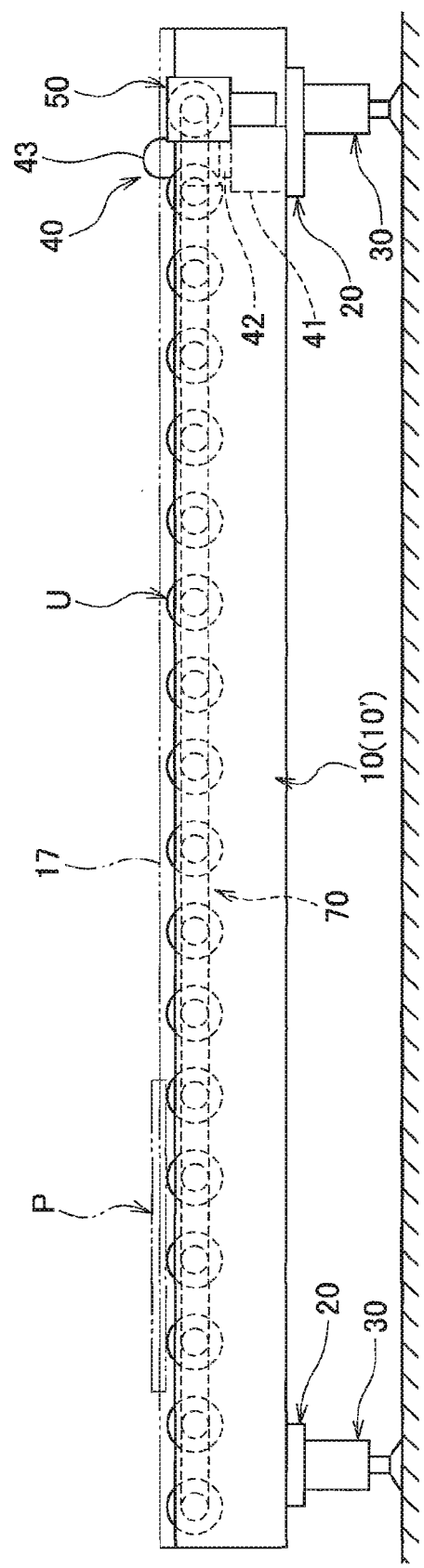
FIG. 2 is a side view showing one embodiment of a conveyor device equipped with roller units in accordance with the present invention.

As shown in FIGS. 1 and 2, this conveyor device includes a pair of conveyor frames 10, 10' extending in parallel with the conveyance direction L in which a pallet P as an object being conveyed is conveyed; connecting frames 20 for connecting the paired conveyor frames 10, 10'; leg parts 30 provided under the connecting frames 20; a stopper mechanism 40 provided on the connecting frame 20 to stop the pallet P at a predetermined position; a plurality of roller units U arranged along the paired conveyor frames 10, 10'; a driving source 50 for giving a driving force to one of the roller units U; a connecting rod 60 for connecting the roller unit U provided on one conveyor frame 10 and the roller unit U provided on the other conveyor frame 10' to each other; and two endless chains 70, serving as a power transmitting member, for interlocking the plurality of roller units U arranged on one conveyor frame 10 with each other and the plurality of roller units U arranged on the other conveyor frame 10' with each other.

Figure 5:
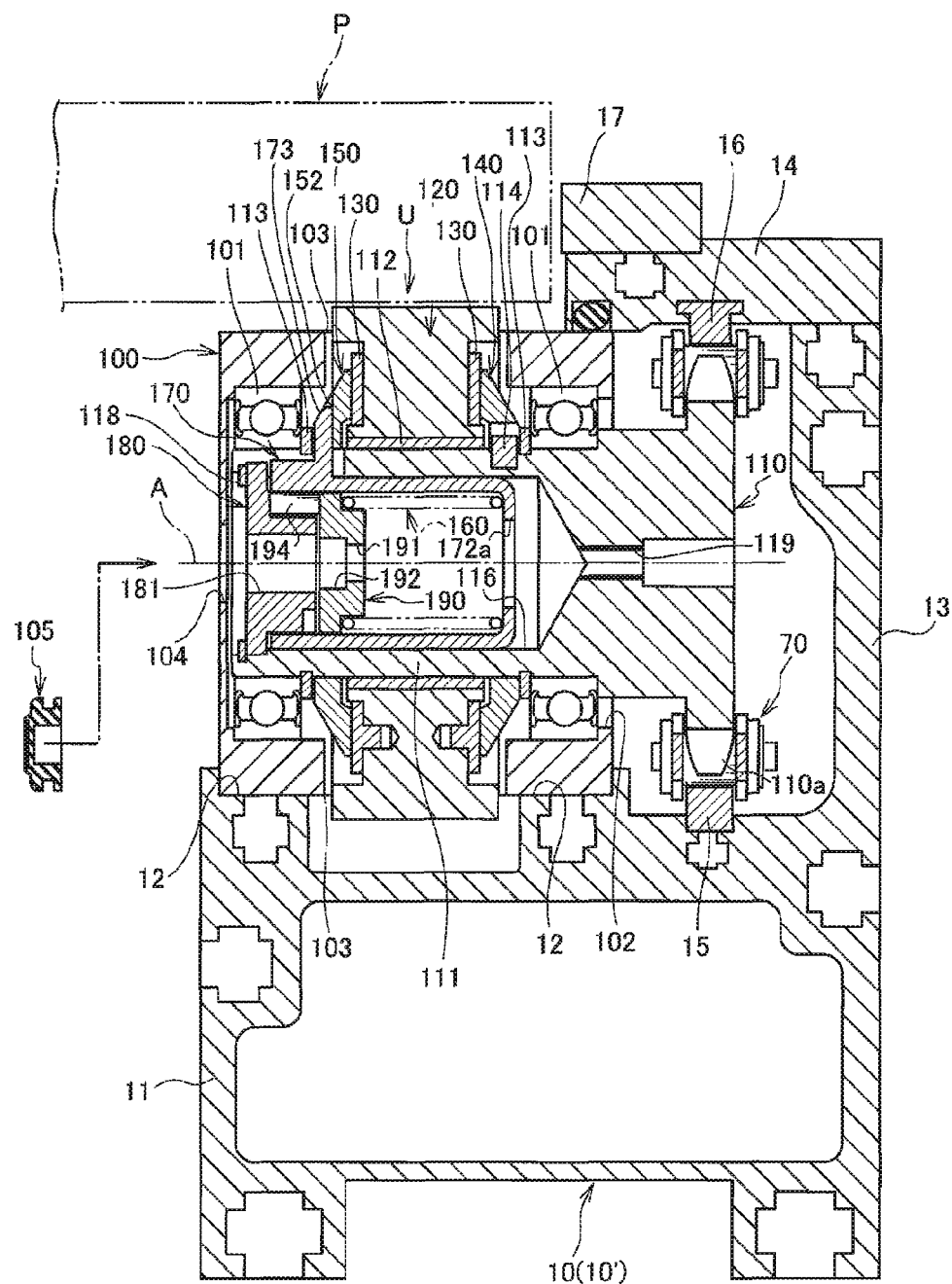
FIG. 5 is a partial sectional view of a conveyor device equipped with roller units in accordance with the present invention.
Figure 6A:
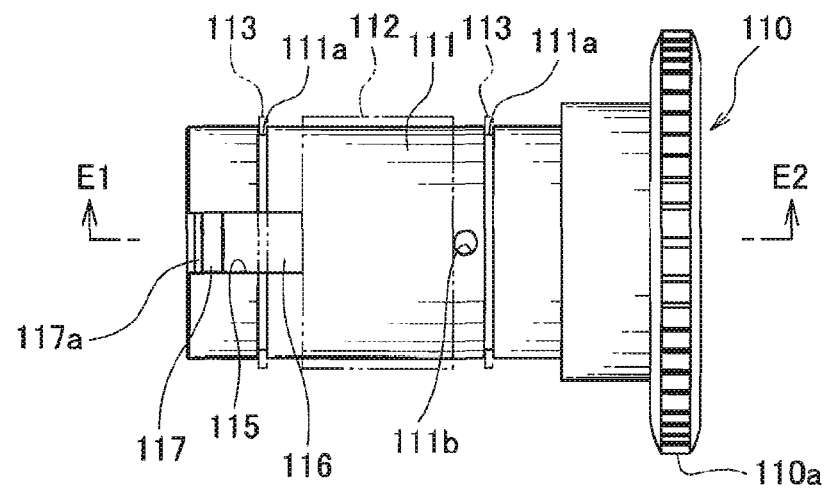
FIG. 6A is a plan view showing a rotating body that is a part of a roller unit in accordance with the present invention.
Figure 6B:
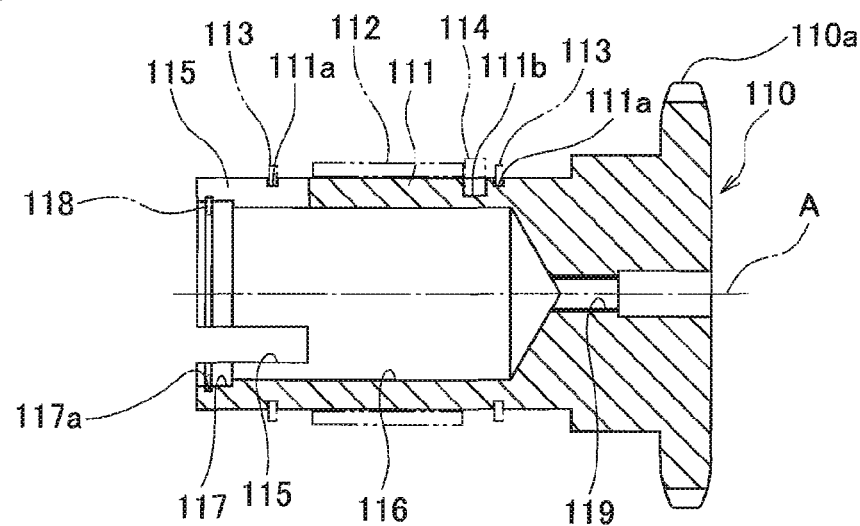
FIG. 6B is a sectional view of a rotating body, taken along the line E1-E1 of FIG. 6A.
Figure 6C:
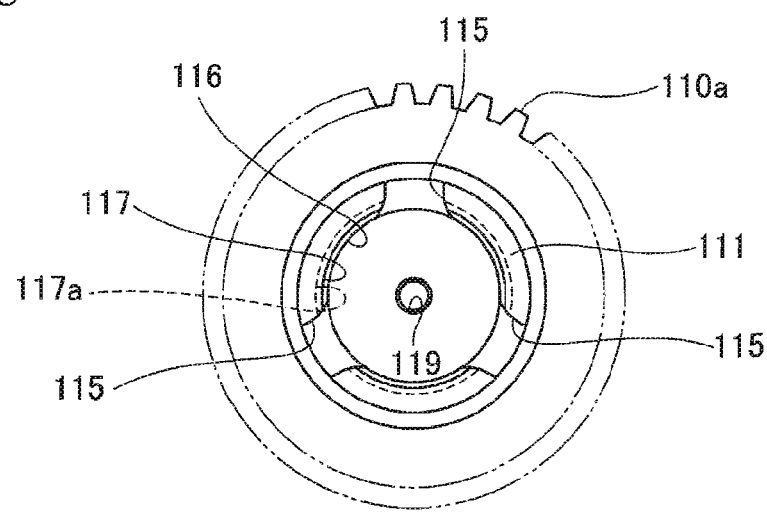
FIG. 6C is an end view of a cylindrical part included in the rotating body shown in FIG. 6.

As shown in FIG. 5, the conveyor frame 10, 10' includes a base part 11 that is formed so that the interior thereof is hollow and extends in the horizontal direction (the conveyance direction L); a carrying part 12 for arrangingly carrying unit frames 100, described later, incorporating three roller units U; a side wall part 13; a cover part 14 connected to the upper end of the side wall part 13 so as to cover a sprocket 110 of the roller unit U, described later; a lower holding member 15 provided in the base part 11 to regulate the oscillation of the endless chain 70 from the downside; an upper holding member 16 provided in the cover part 14 to regulate the oscillation of the endless chain 70 from the upside; and a guide member 17 provided on the upper surface of the cover part 14 to guide the pallet P in the conveyance direction L.

As shown in FIG. 5, the carrying part 12 is formed so as to extend in the conveyance direction L in such a manner that the unit frames 100 are engaged and positioned and so as to have a substantially rectangular concave cross section.

The cover part 14 presses the plurality of unit frames 100 arranged so as to be fitted into the carrying part 12, and is fixed to the conveyor frame 10, 10'.

As shown in FIGS. 1 and 2, the connecting frame 20 has a substantially rectangular flat plate shape and is formed so as to be long in the direction perpendicular to the conveyance direction L so that one conveyor frame 10 and the other conveyor frame 10' are strongly connected. The connecting frame 20 positioned on the downstream side in the conveyance direction L holds the stopper mechanism 40.

The leg part 30 is formed so as to extend downward in the vertical direction from the lower part of the connecting frame 20. The conveyor device may be made easily movable by providing with a wheel at the lower end of the leg part 30.

As shown in FIGS. 1 and 2, the stopper mechanism 40 includes an elevating actuator 41 provided on the upper surface of the connecting frame 20; an elevating rod 42 that is driven elevatingly; and a stopper member 43 that is provided at the upper end of the elevating rod 42 and capable of coming into contact with a notch part P1 of the pallet P.

As the elevating actuator 41, a hydraulic or pneumatic cylinder, a motor and ball screw, and other mechanisms can be used.

The stopper member 43 is formed so as to go into the notch part P1 of the pallet P and come into contact therewith.

Figure 4:
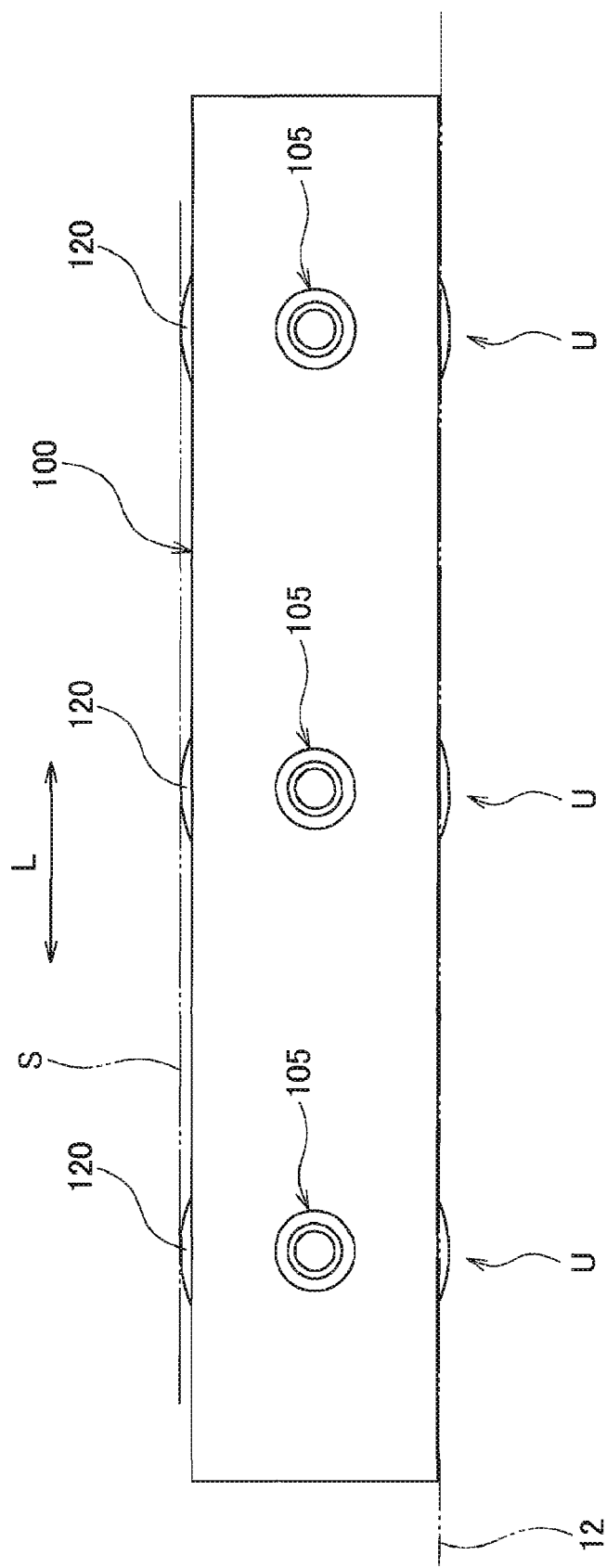
FIG. 4 is a side view showing one embodiment in which a roller unit in accordance with the present invention is modularized.

The stopper mechanism 40 is configured so that when the pallet P being conveyed is stopped, the elevating actuator 41 raises the elevating rod 42 to project the stopper member 43 from a conveyance plane S (as shown in FIG. 4, a plane defined by the upper end of the later-described roller 120), and on the other hand, when the pallet P is conveyed to the downstream side by releasing the stop thereof, the elevating actuator 41 lowers the elevating rod 42 to retract the stopper member 43 from the conveyance plane S.

As shown in FIGS. 1 and 2, the driving source 50 is provided on the outside surface of one conveyor frame 10 and is directly connected to one of the roller units U. As the driving source 50, a DC motor, an AC motor, and other motors having a rotating shaft can be used.

As shown FIG. 1, the connecting rod 60 is connected so that (the later-described sprockets 110 of) the roller units U arranged on one conveyor frame 10 and (the sprockets 110 of) the roller units U arranged on the other conveyor frame 10' are rotated integrally.

The conveyor device is provided with two endless chains 70. One endless chain 70 is wound so as to rotate the plurality of roller units U arranged on one conveyor frame 10 in association with each other, and the other endless chain 70 is wound so as to rotate the plurality of roller units U arranged on the other conveyor frame 10' in association with each other.

Figure 3:
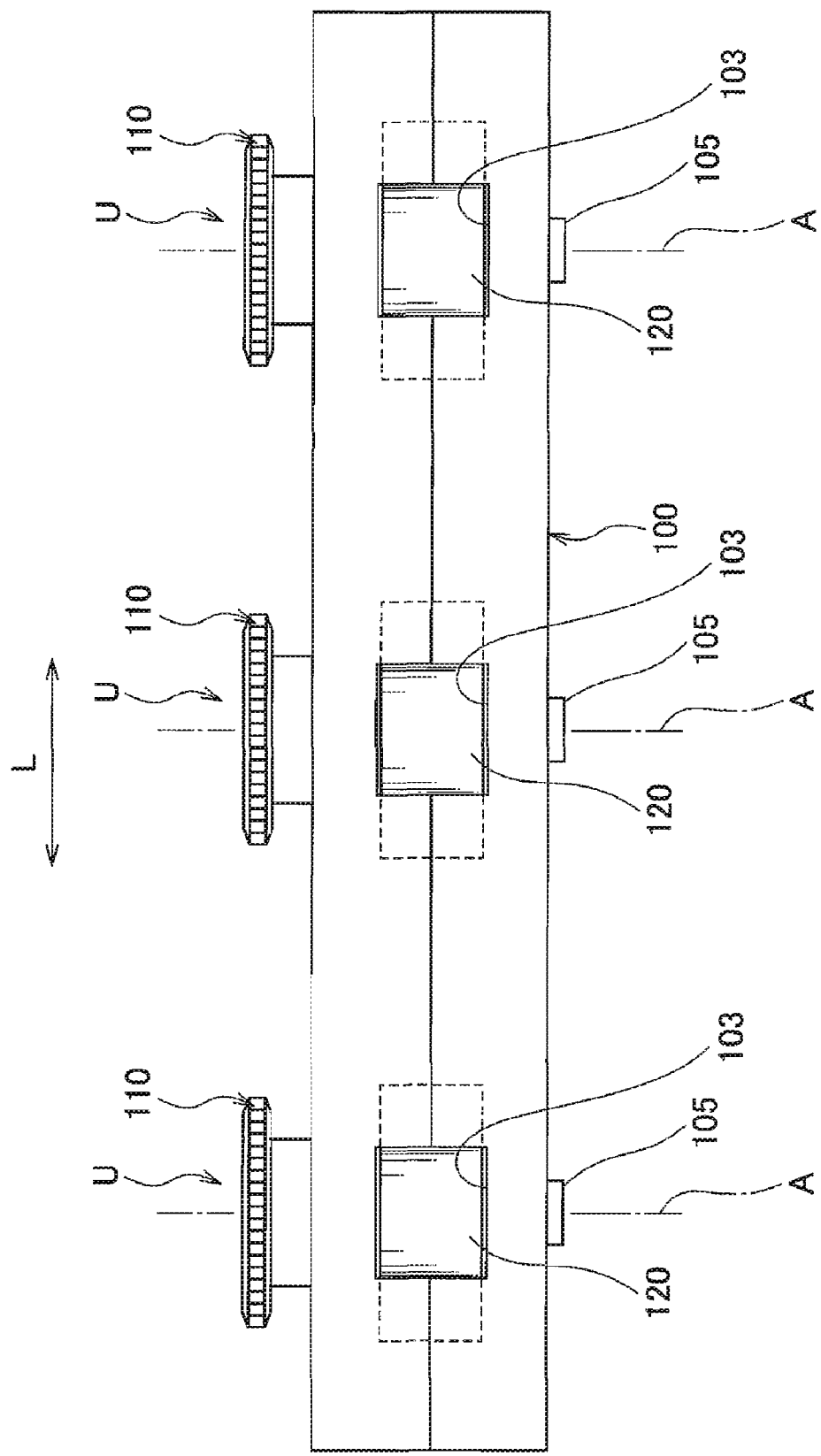
FIG. 3 is a plan view showing one embodiment in which a roller unit in accordance with the present invention is modularized.

As shown in FIGS. 3, 4 and 5, the unit frame 100 is formed so as to be divided into two and connected to each other after the three roller units U have been incorporated. The unit frame 100 includes six bearings 101 fitted on the inside thereof; three circular openings 102 for allowing cylindrical parts 111 of the later-described sprockets 110 to pass through; six (three on the upside and three on the downside) rectangular openings 103 for exposing the later-described roller 120; three adjustment holes 104 for allowing an adjusting tool to pass through; and three rubber-made lids 105 provided detachably so as to cover the adjustment holes 104.

As shown in FIGS. 3 and 4, in the unit frame 100, three roller units U are incorporated as a set, and are modularized.

Since three roller units U are incorporated in one unit frame 100 and modularized beforehand as described above, by arrangingly mounting the modularized unit frames 100 on the conveyor frames 10 and 10', the conveyor device can be assembled. Therefore, ease and simplification of assembling work of the device as a whole and high accuracy of assembly can be attained.

As shown in FIG. 5, the roller unit U includes the sprocket 110, serving as a rotating body, integrally having the cylindrical part 111 whose center is a predetermined axis A; the roller 120 externally fitted at the outer periphery of the cylindrical part 111 via a bush 112 so as to be rotatable around the axis A; friction plates 130 assembled so as to be in closely contact with both side surfaces of the roller 120; a first thrust plate 140 and a second thrust plate 150, serving as a pair of thrust plates, arranged adjacently outside the friction plates 130; a compression spring 160 arranged inside the cylindrical part 111; a spring holder 170 for accommodating and holding the compression spring 160; a regulation holder 180 arranged on the outside in the axis direction A of the compression spring 160 and fixed to the cylindrical part 111; and an adjuster 190 arranged so as to be interposed between the compression spring 160 and the regulation holder 180.

By the compression spring 160, the spring holder 170, the regulation holder 180, and the adjuster 190, a pressing force adjusting mechanism is formed which adjusts a pressing force with which the pair of thrust plates (the first thrust plate 140 and the second thrust plate 150) press the roller 120 while holding it therebetween.

In the axis direction A of the sprocket 110 (the cylindrical part 111), the side on which a tooth row 110a is provided is defined as an inside, and the opposite side is defined as an outside.

As shown in FIGS. 5, 6A, 6B and 6C, the sprocket 110 includes the tooth row 110a around which the endless chain 70 is wound; the cylindrical part 111 which is supported so as to be rotatable around the axis A by the bearings 101 and with which the roller 120 is fitted via the bush 112 on a substantially central region of the outer periphery thereof; two annular grooves 111a which are formed at the outer periphery of the cylindrical part 111 and to which C-shaped regulation rings 113 are fitted; a key hole 111b to which a key member 114 is fitted; three slits 115 formed at equal intervals in the circumferential direction so as to open toward the outside of the axis direction A; an inner peripheral surface 116 defining the internal cavity of the cylindrical part 111; an expanded-diameter inner peripheral surface 117 having a diameter larger than that of the inner peripheral surface 116; an annular groove 117a which is formed in the expanded-diameter inner peripheral surface 117 and to which a C-shaped regulation ring 118 is fitted; and internal threads 119 formed so as to extend in the axis direction A.

Figure 7A:
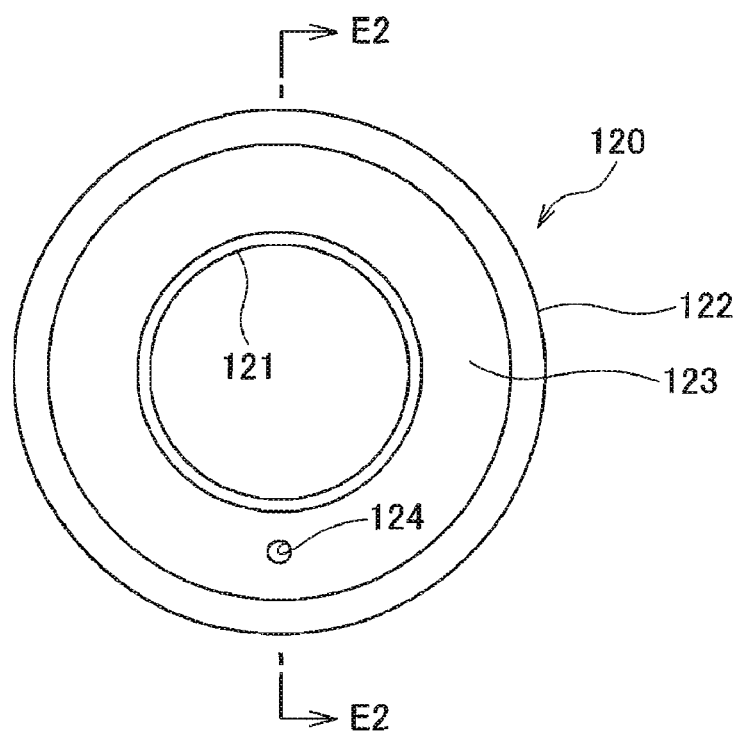
FIG. 7A is a side view showing a roller that is a part of a roller unit in accordance with the present invention.
Figure 7B:
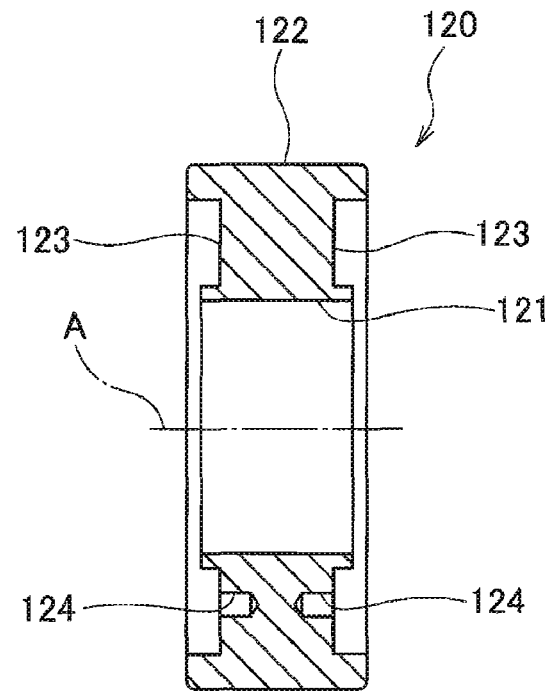
FIG. 7B is a sectional view of a roller, taken along the line E2-E2 of FIG. 7A.

As shown in FIGS. 5, 7A and 7B, the roller 120 includes an inner peripheral surface 121 that is rotatably engaged, via the bush 112, with the outer periphery of the cylindrical part 111 of the sprocket 110; an outer peripheral surface 122 that carries the pallet P; both side surfaces 123 positioned on the inside and the outside in the axis direction A; and two fitting holes 124 formed in both the side surfaces 123.

The bush 112 is formed into a cylindrical shape by using a material that generates a frictional force between the inner peripheral surface thereof and the outer peripheral surface of the cylindrical part 111, and is press fitted in the inner peripheral surface 121 of the roller 120 so as to be rotated integrally with the roller 20.

The roller 120 rotates integrally with the cylindrical part 111 (the sprocket 110) and generates a conveying force by means of a frictional force, which is generated between the cylindrical part 111 and the bush 112 and also depends on the load of the pallet P, in a state of carrying the pallet P.

Figure 8A:
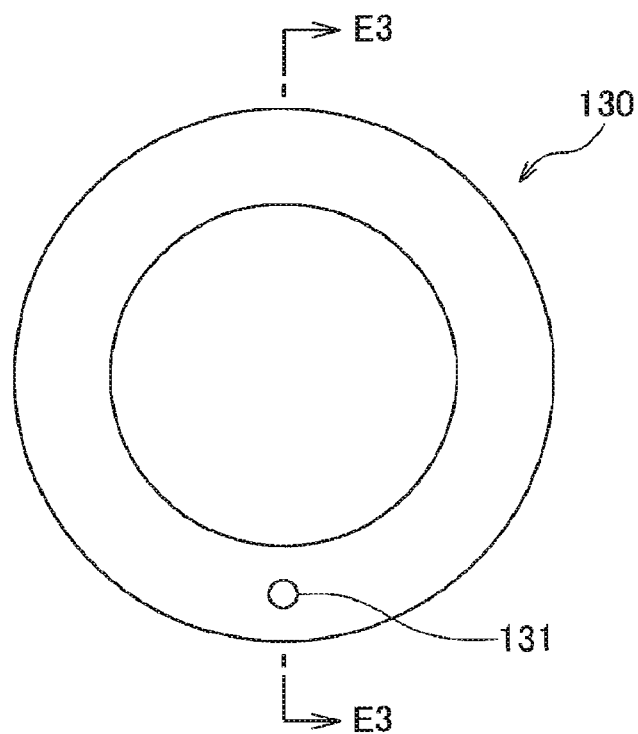
FIG. 8A is a side view showing a friction plate that is a part of a roller unit in accordance with the present invention.
Figure 8B:
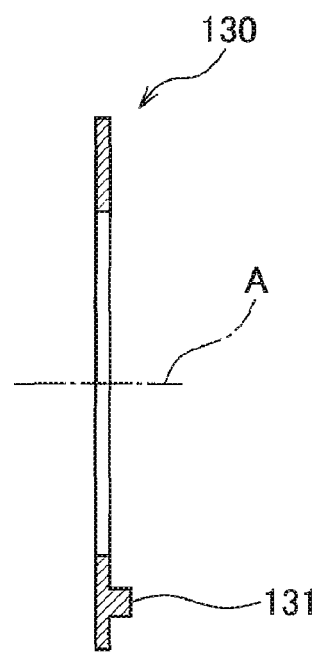
FIG. 8B is a sectional view of the friction plate, taken along the line E3-E3 of FIG. 8A.

As shown in FIGS. 5, 8A and 8B, the friction plate 130 is formed into an annular shape by a thin plate so as to integrally have a protrusion 131. As shown in FIG. 5, the friction plate 130 is assembled with the protrusion 131 fitted in the fitting hole 124 so as to be in close contact with the side surface 123 on the inside of the axis direction A of the roller 120 and the side surface 123 on the outside of the axis direction A thereof.

Figure 9A:
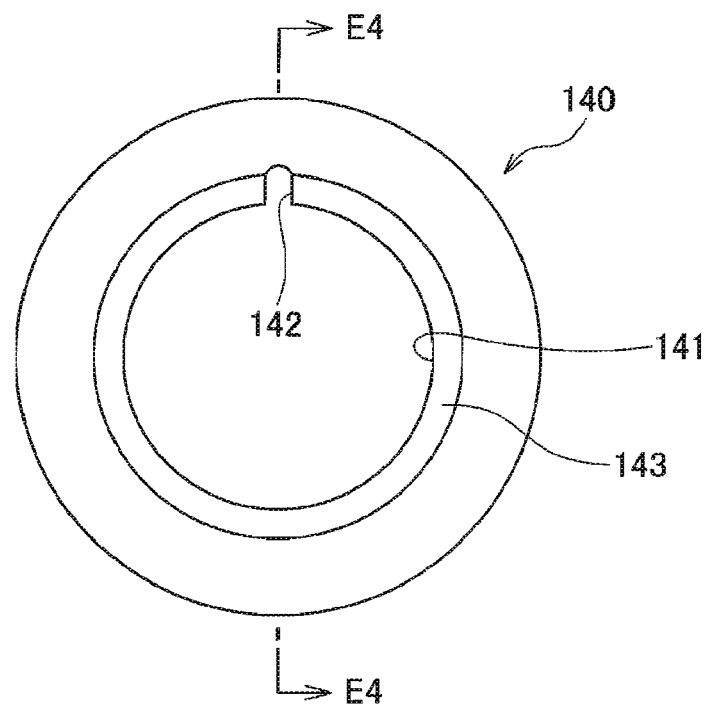
FIG. 9A is a side view showing a first thrust plate that is a part of a roller unit in accordance with the present invention.
Figure 9B:
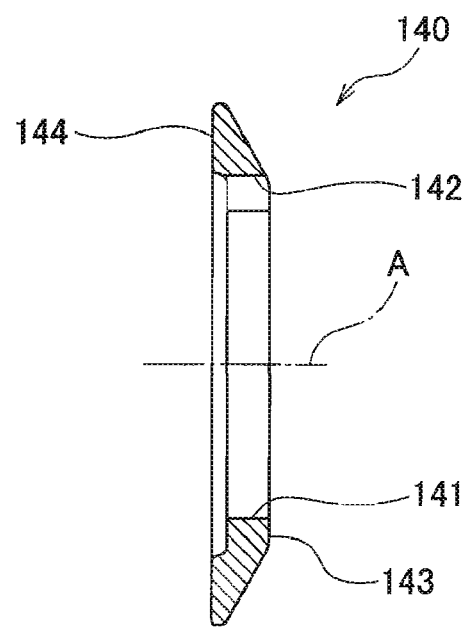
FIG. 9B is a sectional view of the first thrust plate, taken along the line E4-E4 of FIG. 9A.

As shown in FIGS. 5, 9A and 9B, the first thrust plate 140 includes a through hole 141 engaging with the outer periphery of the cylindrical part 111; a notch 142 formed outward in the radial direction from the through hole 141 so as to accommodate a key member 114; an annular contact surface 143 that is in contact with the regulation ring 113 fitted in the annular groove 111a on the inside of the axis direction A of the cylindrical part 111; and an annular pressing surface 144 that is in closely contact with the friction plate 130 joined to the side surface 123 on the inside of the axis direction A of the roller 120.

The first thrust plate 140 is fitted on the cylindrical part 111 from the outside of the axis direction A, and is pushed in to a position at which the contact surface 143 comes into contact with the regulation ring 113 and is regulated.

Figure 10A:
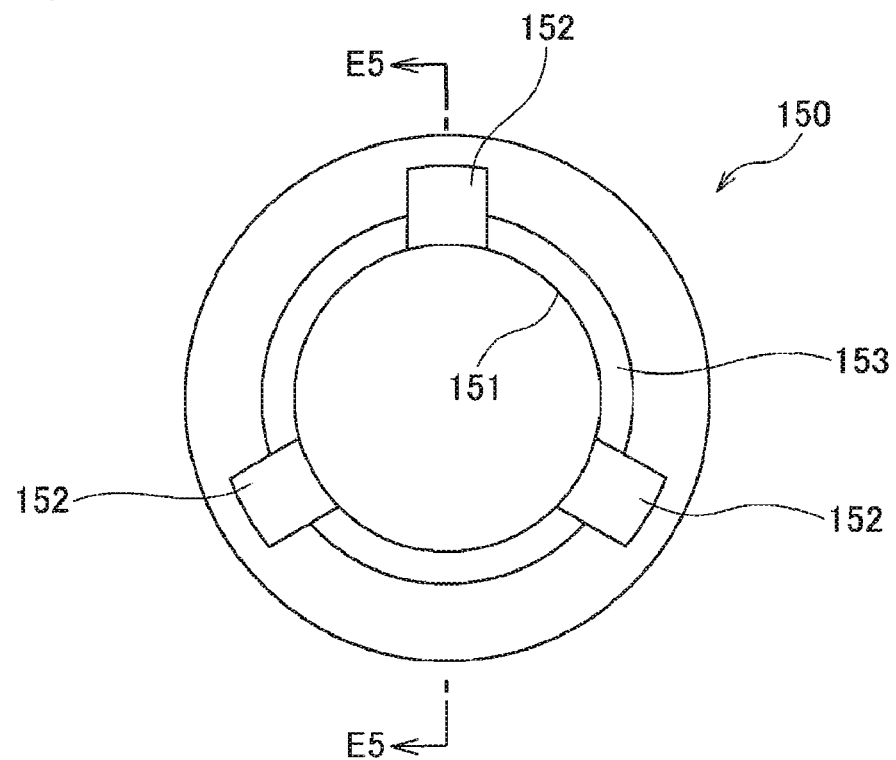
FIG. 10A is a side view showing a second thrust plate that is a part of a roller unit in accordance with the present invention.
Figure 10B:
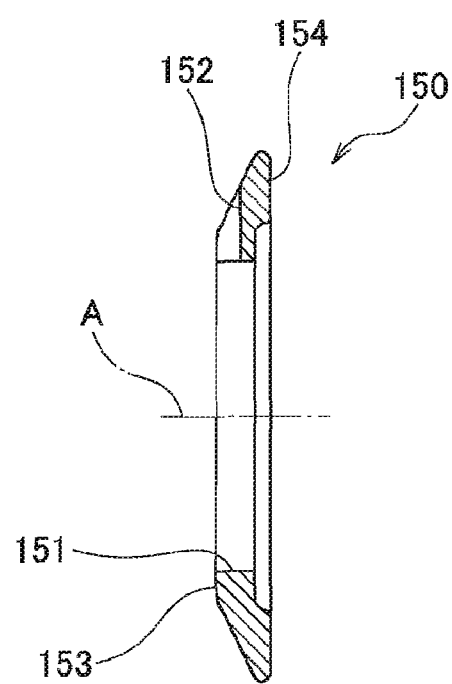
FIG. 10B is a sectional view of the second thrust plate, taken along the line E5-E5 of FIG. 10A.

As shown in FIGS. 5, 10A and 10B, the second thrust plate 150 includes a through hole 151 engaging with the outer periphery of the cylindrical part 111; three receiving grooves 152 that are formed at equal intervals in the circumferential direction so as to extend in the radial direction from the through hole 151 and receive contact pieces 173 of the spring holder 170, described later, from the outside of the axis direction A; an annular contact surface 153 which is in contact with the regulation ring 113 fitted in the annular groove 111a on the outside of the axis direction A of the cylindrical part 111 and the movement of which to the outside is regulated; and an annular pressing surface 154 that is in closely contact with the friction plate 130 joined to the side surface 123 on the outside of the axis direction A of the roller 120.

The second thrust plate 150 is fitted on the cylindrical part 111 from the outside of the axis direction A, and is arranged so that the pressing surface 154 thereof is in closely contact with the friction plate 130. The contact surface 153 comes into contact with the regulation ring 113 assembled thereafter, so that the movement of the second thrust plate 150 to the outside of the axis direction A is regulated.

Figure 11A:
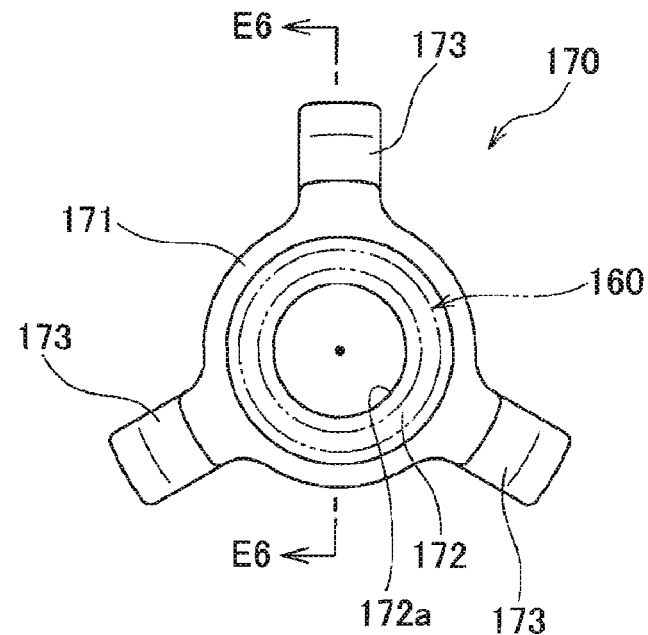
FIG. 11A is an end view showing a spring holder that is a part of a roller unit in accordance with the present invention.
Figure 11B:
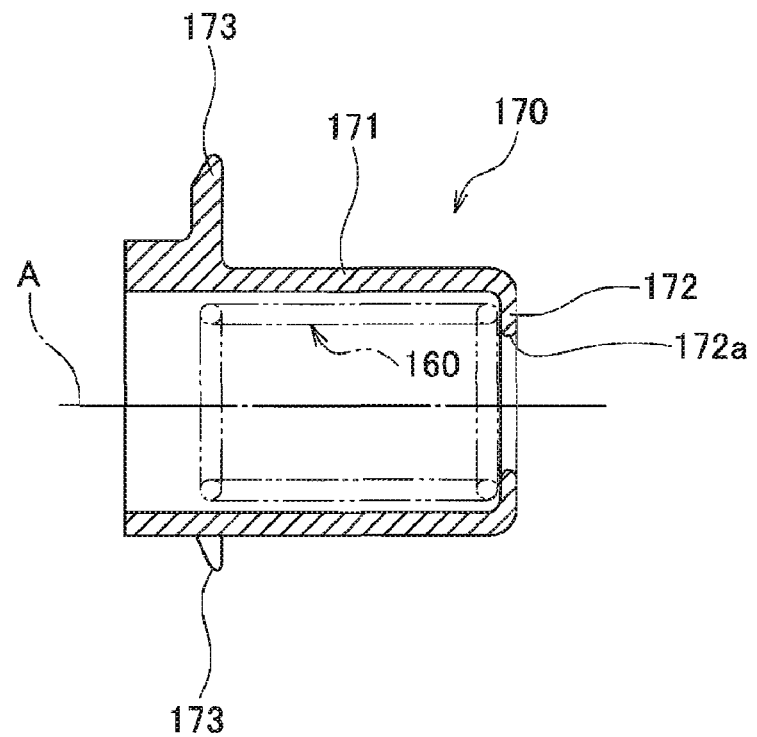
FIG. 11B is a sectional view of the spring holder, taken along the line E6-E6 of FIG. 11A.

As shown in FIGS. 5, 11A and 11B, the compression spring 160 is a coil spring incorporated in a state of being capable of being compressed in the axis direction A. The compression spring 160 is accommodated in the spring holder 170 fitted to the inside of the cylindrical part 111 in the state in which one end thereof is in contact with a bottom 172 of a bottomed cylindrical part 171 of the later-described spring holder 170, and the other end thereof is in contact with a receiving part 193 of the later-described adjuster 190.

As shown in FIGS. 5, 11A and 11B, the spring holder 170 includes the bottomed cylindrical part 171 that is fitted into the inner peripheral surface 116 of the cylindrical part 111 and accommodates the compression spring 160; the bottom 172 serving as a receiving part for receiving one end of the compression spring 160; a circular through hole 172a formed in the bottom 172; and the three contact pieces 173 formed at equal intervals in the circumferential direction so as to project in the radial direction with respect to the axis A.

Figure 16:
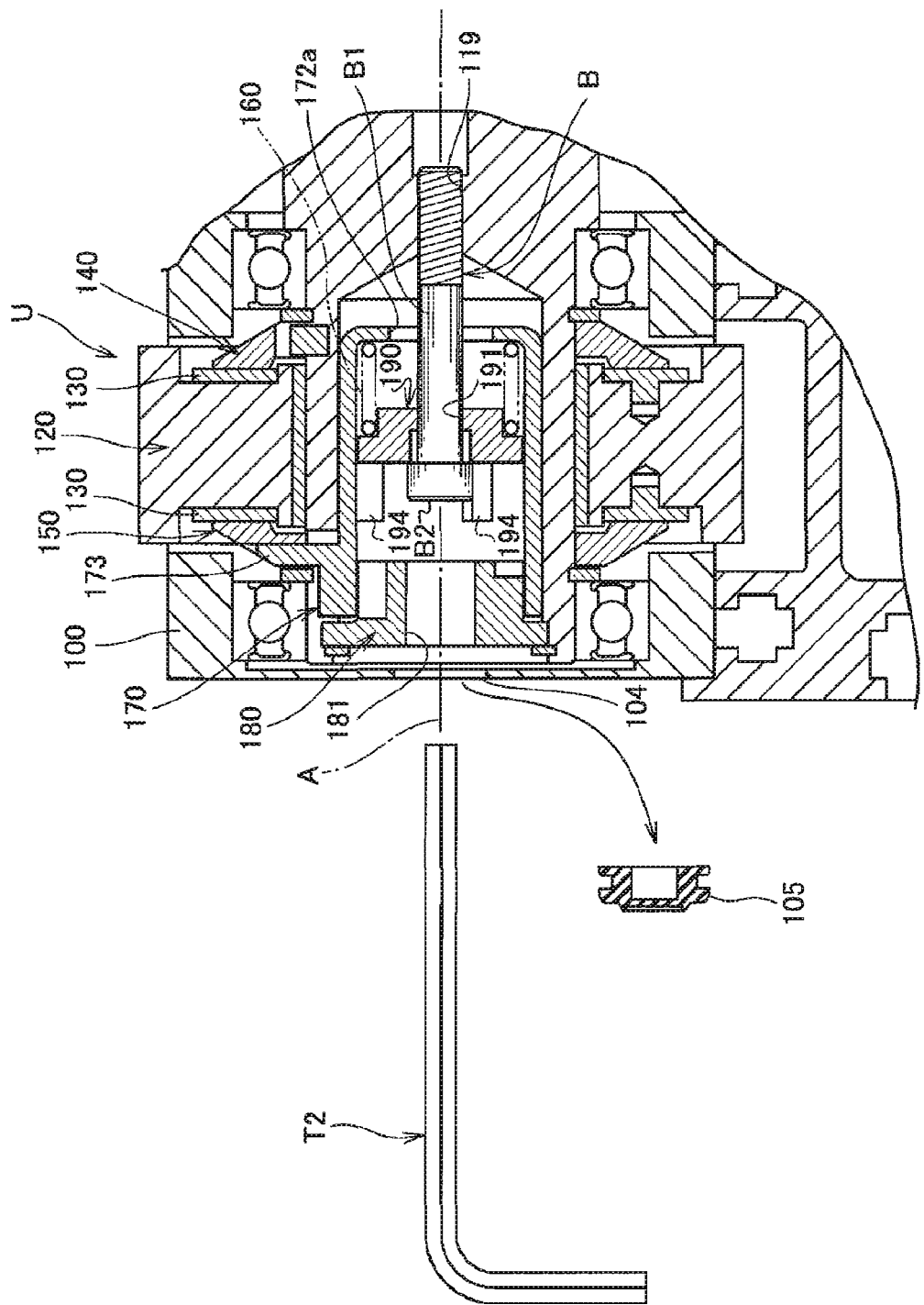
FIG. 16 is a sectional view for explaining work for fastening, with a bolt, an adjuster of a roller unit in accordance with the present invention.

As shown in FIG. 16, the through hole 172a is formed so as to allow at least a shank B1 formed with external threads of a bolt B threadedly engaged with the internal threads 119 to pass through.

The spring holder 170 is assembled so as to be rotated integrally with the cylindrical part 111 by fitting the bottomed cylindrical part 171 into the inner peripheral surface 116 of the cylindrical part 111 so that the contact pieces 173 go into the slits 115 in the cylindrical part 111 and the receiving grooves 152 of the second thrust plate 150 assembled beforehand.

Since the three contact pieces 173 are provided at equal intervals in the circumferential direction, the contact pieces 173 can press the second thrust plate 150 evenly in the circumferential direction. Also, since the contact pieces 173 are fitted into the receiving grooves 152 of the second thrust plate 150, the contact pieces 173 can rotate the second thrust plate 150 integrally with the cylindrical part 111, and also can put parts together in the axis direction A. Therefore, the size in the axis direction A is further reduced, so that the roller unit U can be made narrower in width and smaller in size.

As shown in FIGS. 5, 12A, 12B and 12C, the regulation holder 180 includes a circular through hole 181 extending in the axis direction A; a cylindrical part 182 formed around the through hole 181; a plurality of concave parts 183 (a first concave part 183a, a second concave part 183b, a third concave part 183c, a fourth concave part 183d) formed so as to depress the outer peripheral surface of the cylindrical part 182 and to form a step-like level difference in the axis direction A; a circular collar part 184 that extends in the radial direction from the cylindrical part 182 and is fitted into the expanded-diameter inner peripheral surface 117 of the cylindrical part 111; and three protrusions that project to the outside in the radial direction from the collar part 184 and are fitted into the slits 115 of the cylindrical part 111.

As shown in FIG. 16, the through hole 181 is formed so as to have a size such as to allow a head B2 and the shank B1 of the bolt B threadedly engaged with the internal threads 119 of the sprocket 110 to pass through and also to allow an adjusting tool T1 and a screwing tool T2 to pass through.

Figure 12A:
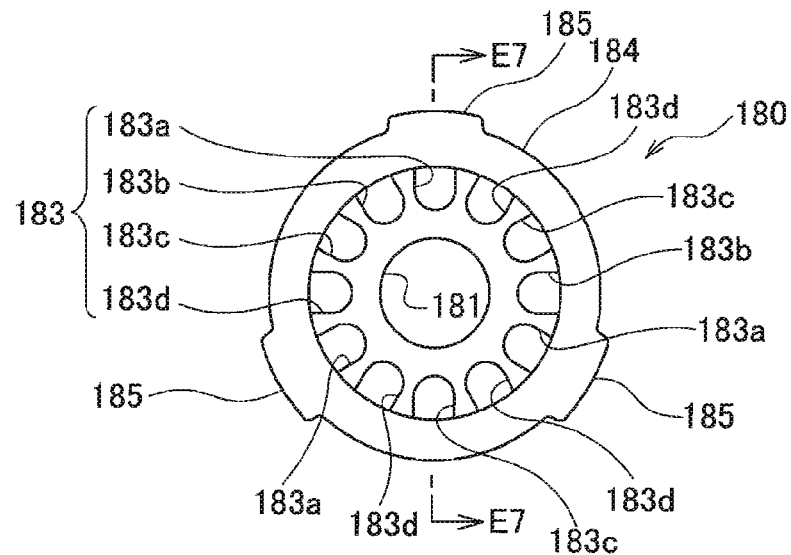
FIG. 12A is an inside end view showing a regulation holder that is a part of a roller unit in accordance with the present invention.
Figure 12B:
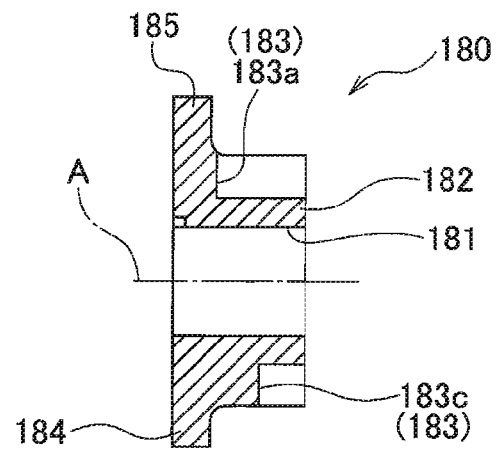
FIG. 12B is a sectional view of the regulation holder, taken along the line E7-E7 of FIG. 12A.
Figure 12C:
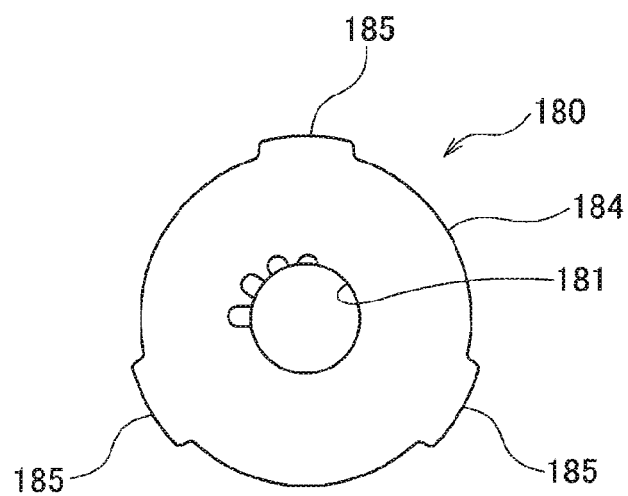
FIG. 12C is an outside end view showing a regulation holder that is a part of a roller unit in accordance with the present invention.

As shown in FIG. 12B, the plurality of concave parts 183 are formed so as to accommodate engagement protrusions 194, described later, of the adjuster 190 arranged on the inside of the axis direction A. Also, as shown in FIGS. 12A and 13, the concave parts 183 are formed so as to include three sets of concave parts 183 arranged at equal intervals of 30 degrees in the circumferential direction by making the first concave part 183a, the second concave part 183b, the third concave part 183c, and the fourth concave part 183d one set of concave parts 183.

Figure 13:
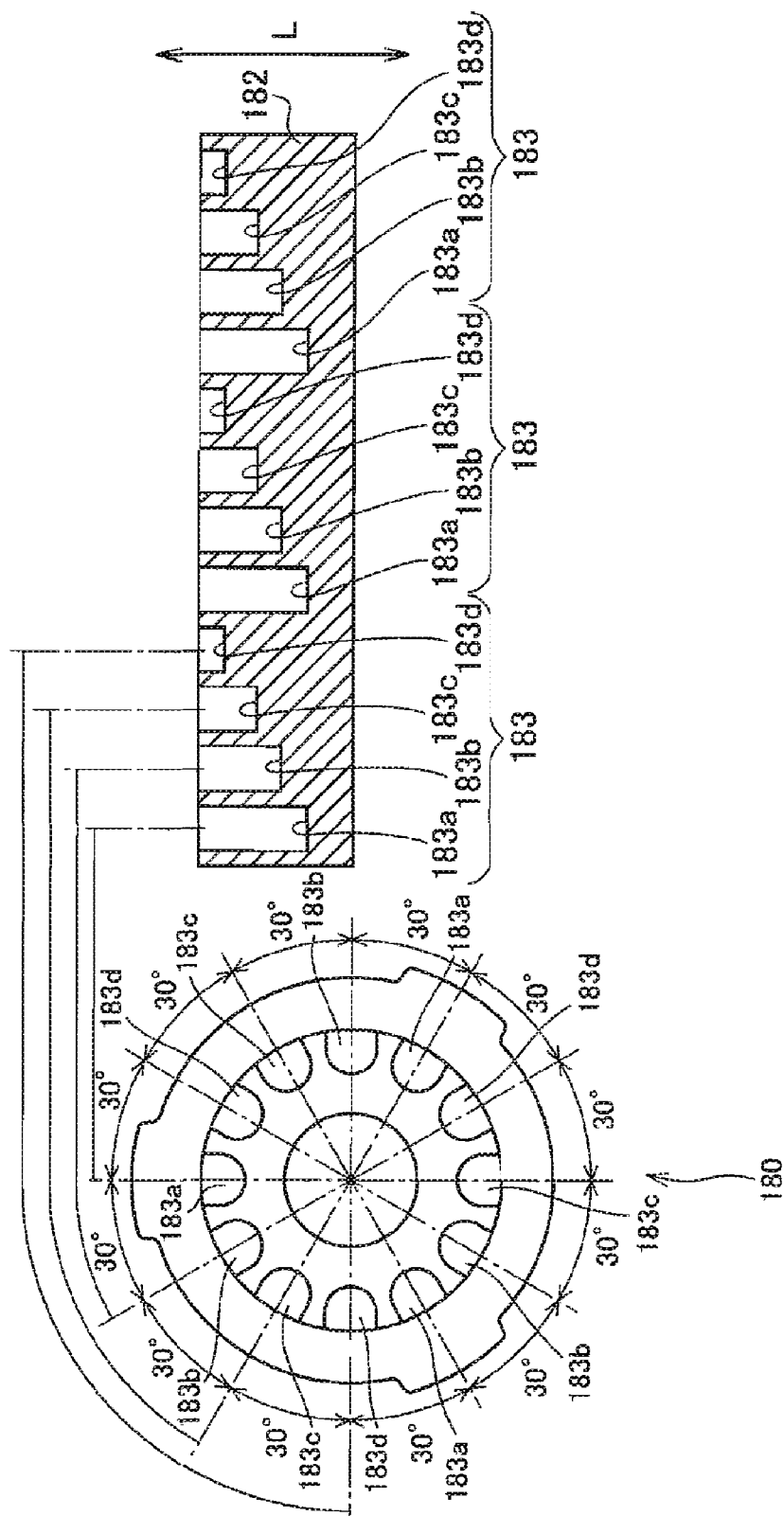
FIG. 13 is a development for explaining the structure of a regulation holder that is a part of a roller unit in accordance with the present invention.

As shown in FIG. 13, the concave parts 183 are formed so that the depths of the first concave part 183a to the fourth concave part 183d are in the order of the first concave part 183a>the second concave part 183b>the third concave part 183c>the fourth concave part 183d.

For the regulation holder 180, after the adjuster 190 has been assembled to the inside of the cylindrical part 111, while the collar part 184 of the regulation holder 180 is fitted into the expanded-diameter inner peripheral surface 117 of the cylindrical part 111, and the regulation holder 180 is fitted into the inside of the cylindrical part 111 from the outside of the axis direction A so that the three protrusions 185 are engaged with the corresponding slits 115, and the regulating ring 118 is installed in the annular groove 117a from the outside. Thereby, the rotation around the axis A of the regulation holder 180 is regulated and the regulation holder 180 is rotated integrally with the cylindrical part 111, and the outward movement in the axis direction A thereof is regulated.

Figure 14A:
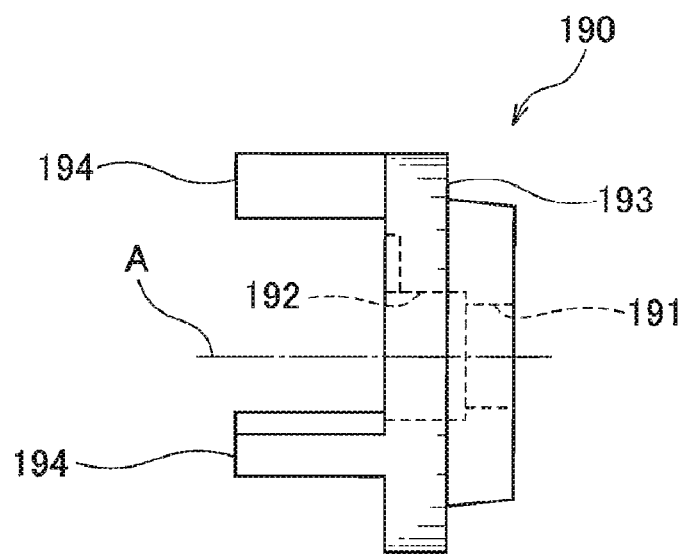
FIG. 14A is a front view showing an adjuster that is a part of a roller unit in accordance with the present invention.
Figure 14B:
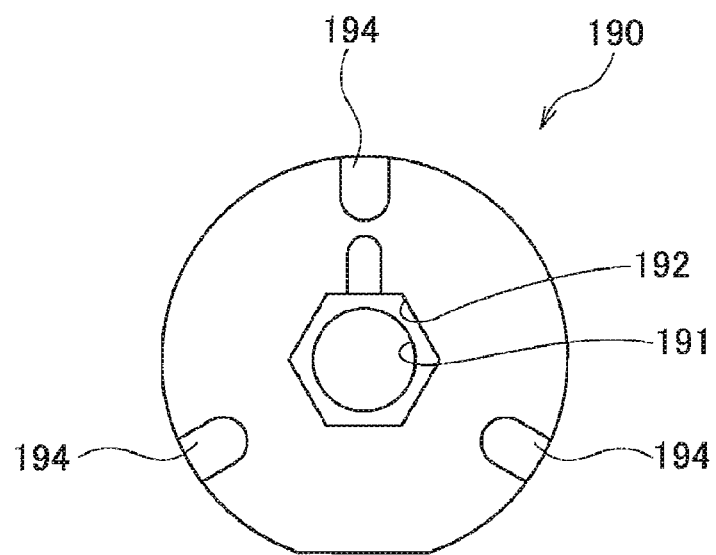
FIG. 14B is an outside end view showing an adjuster that is a part of a roller unit in accordance with the present invention.

As shown in FIGS. 5, 14A and 14B, the adjuster 190 includes a circular through hole 191 penetrating in the axis direction A; a hexagonal connecting hole 192 formed coaxially with the through hole 191 to connect the tip end of the tool T1 (refer to FIG. 15); an annular receiving part 193 for receiving the other end of the compression spring 160; and three engagement protrusions 194 formed at equal intervals (120-degree intervals) in the circumferential direction so as to project in the direction facing to the regulation holder 180 (outward in the axis direction A).

The through hole 191 is formed so as to have a size such that the head B2 of the bolt B is not allowed to pass through and only the shank B1 thereof is allowed to pass through.

The engagement protrusions 194 are formed so as to be capable of making contact with and separating from the concave parts 183 of the regulation holder 180 in the axis direction A.

For the adjuster 190, after the spring holder 170 has been incorporated to the inside of the cylindrical part 111 and successively the compression spring 160 has been incorporated, the adjuster 190 is fitted to the inner peripheral surface 116 of the cylindrical part 111 while the other end of the compression spring 160 is pushed in and compressed by the receiving part 193, and is set so that the three engagement protrusions 194 engage with the three concave parts 183 having the same depth (any of the three first concave parts 183a, the three second concave parts 183b, the three third concave parts 183c, and the three fourth concave parts 183d) of the regulation holder 180 incorporated from the outside of the axis direction A.

The adjuster 190 is configured so that, in this state, when the engagement protrusions 194 are pushed in through a distance such as to separate from the concave parts 183 by using the tool T1, the adjuster 190 can be rotated appropriately around the axis A.

In this embodiment, the case where the adjuster 190 and the regulation holder 180 are incorporated separately has been described. However, the assembling procedure may be such that the adjuster 190 and the regulation holder 180 are assembled beforehand to each other while being aligned are modularized, and this modularized unit is fitted to the inside of the cylindrical part 111. In this case, the assembling work can be performed easily while checking that the engagement protrusions 194 of the adjuster 190 and the concave parts 183 (the first concave parts 183a) of the regulation holder 180 are aligned with each other.

As shown in FIG. 5, in the state in which the roller unit U having the above-described configuration is incorporated in the unit frame 100 and the conveyor device, when the driving source 50 generates a rotational driving force, the sprocket 110 is rotationally driven directly and via the endless chain 70.

Also, a frictional force is generated between the outer peripheral surface of the cylindrical part 111 of the sprocket 110 and the inner peripheral surface of the bush 112 according to a load that is received by the roller 120 from the pallet P, and the rotational force of the sprocket 110 is transmitted to the roller 120 via this frictional force, by which the roller 120 is rotated to convey the pallet P.

At this time, the first thrust plate 140 and the second thrust plate 150 rotate integrally with the cylindrical part 111 of the sprocket 110, and the spring holder 170, the compression spring 160, the regulation holder 180, and the adjuster 190 that are arranged inside the cylindrical part 111 also rotate integrally with the cylindrical part 111 of the sprocket 110.

Also, a state is formed in which the roller 120 is subjected to the urging force of the compression spring 160, the pressing force with which the contact pieces 173 of the spring holder 170 press the second thrust plate 150 toward the inside of the axis direction A and the pressing force with which the first thrust plate 140 is pressed toward the outside of the axis direction A by reaction, and the pressing force with which the roller 120 is held from both sides in the axis direction A via the two friction plates 130 that are in closely contact with both the side surfaces 123 so as to rotate the roller 120 integrally.

Further, a state is formed in which the engagement protrusions 194 of the adjuster 190 engage with any of the plurality of concave parts 183 (the first concave parts 183a, the second concave parts 183b, the third concave parts 183c, and the fourth concave parts 183d) of the regulation holder 180, and according to the engagement position, the conveying force (rotational force) of the roller 120 is set at a predetermined level.

Therefore, when the level of load applied by the pallet P is not higher than the predetermined level, the roller 120 rotates integrally with the sprocket 110 (the cylindrical part 111), and when the level of load applied by the pallet P exceeds the predetermined level, the roller 120 stops to stop the conveyance of the pallet P, and the state is switched over to a state in which only the sprocket 110 (the cylindrical part 111) idles with the roller 120 stopping.

Also, in the case where a conveying force slightly higher than the conveying force based on the frictional force generated between the bush 112 and the cylindrical part 111 is needed, the needed conveying force can be secured easily by adjusting the adjuster 190. As the result, the pallet P can be conveyed steadily.

Next, the adjusting work for adjusting the conveying force (rotational force) of the roller 120 is explained with reference to FIG. 15.

First, the lid 105 closing the adjustment hole 104 of the unit frame 100 is removed. The adjusting tool T1 having a hexagonal tip end is brought close to the unit frame 100 from the outside of the axis direction A, being caused to pass through the adjustment hole 104 of the unit frame 100 and the through hole 181 of the regulation holder 180, and is connected to the connecting hole 192 of the adjuster 190.

Then, the tool T1 is pushed in to the inside of the axis direction A through a predetermined stroke to separate the engagement protrusions 184 from the concave parts 183. Successively, the tool T1 is turned appropriately around the axis A, that is, the adjuster 190 is turned appropriately. Thereby, the engagement protrusions 184 are caused to correspond to the desired concave parts 183 to be engaged with, and then the tool T1 is pulled out.

Then, the adjuster 190 is pushed toward the outside of the axis direction A by the urging force of the compression spring 160, and the engagement protrusions 184 go into the selected concave parts 183 (any of the first concave parts 183a, the second concave parts 183b, the third concave parts 183c, and the fourth concave parts 183d), and are positioned at a predetermined position in the axis direction A.

Figure 15:
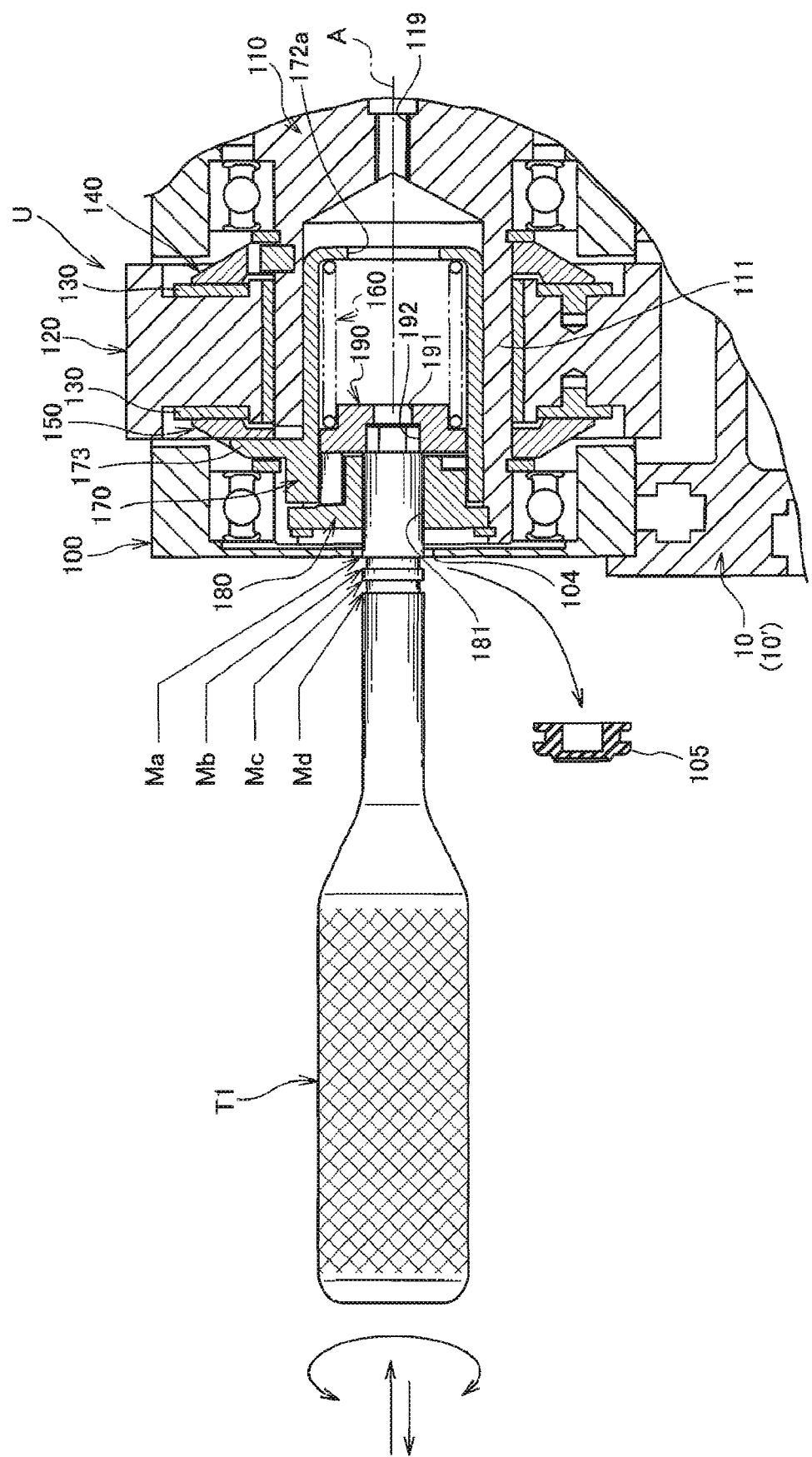
FIG. 15 is a sectional view for explaining work for adjusting an adjuster of a roller unit in accordance with the present invention.

As shown in FIG. 15, the tool T1 is formed with two annular grooves at the outer periphery thereof to define marks Ma, Mb, Mc and Md arranged at predetermined intervals in the axis direction A.

That is to say, when the mark Ma of the tool T1 is flush with the outer wall surface of the unit frame 100, the adjuster 190 is positioned in the state in which the engagement protrusions 184 engage with the first concave parts 183a, so that the compression amount of the compression spring 160 becomes the smallest. Therefore, the pressing force for pressing the roller 120 becomes the lowest, and the conveying force (rotational force) of the roller 120 is set at the lowest level.

When the mark Mb of the tool T1 is flush with the outer wall surface of the unit frame 100, the adjuster 190 is positioned in the state in which the engagement protrusions 184 engage with the second concave parts 183b, so that the compression amount of the compression spring 160 increases by a predetermined amount as compared with the aforementioned case. Therefore, the pressing force for pressing the roller 120 increases by a predetermined amount, and the conveying force (rotational force) of the roller 120 is set at a level higher by a predetermined amount.

When the mark Mc of the tool T1 is flush with the outer wall surface of the unit frame 100, the adjuster 190 is positioned in the state in which the engagement protrusions 184 engage with the third concave parts 183c, so that the compression amount of the compression spring 160 increases further by a predetermined amount. Therefore, the pressing force for pressing the roller 120 increases further by a predetermined amount, and the conveying force (rotational force) is set at a level further higher by a predetermined amount.

When the mark Md of the tool T1 is flush with the outer wall surface of the unit frame 100, the adjuster 190 is positioned in the state in which the engagement protrusions 184 engage with the fourth concave parts 183d, so that the compression amount of the compression spring 160 becomes the largest. Therefore, the pressing force for pressing the roller 120 becomes the highest, and the conveying force (rotational force) is set at the highest level.

Since the pressing force adjusting mechanism is composed of the compression spring 160, the spring holder 170, the regulation holder 180, and the adjuster 190 only as described above, simplification of the structure, collection of the parts, and reduction in device size can be attained.

Also, since the pressing force adjusting mechanism is arranged inside the cylindrical part 111 that supports the roller 120, the size in the axis direction A of the sprocket 110 (the cylindrical part 111) decreases, so that the roller unit U can be made narrower in width and smaller in size. Therefore, the versatility for various types of conveyor devices can be increased.

Further, when the pressing force adjusting mechanism is assembled, the compression spring 160 is inserted into the spring holder 170 so that the contact pieces 173 are brought into contact with the second thrust plate 150 and one end of the compression spring 160 is seated against the bottom 172, the adjuster 190 is mounted so as to press the other end of the compression spring 160, and the regulation holder 180 is mounted from the outside and is fixed to the cylindrical part 111, by which the pressing force adjusting mechanism can be assembled easily.

Furthermore, by appropriately turning the adjuster 190 from the outside of the axis direction A, the compression amount of the compression spring 160 is adjusted, by which the pressing force with which the second thrust plate 150 and the first thrust plate 140 press both the side surfaces 123 of the roller 120 via the contact pieces 173 (that is, the conveying force of the roller 120) can be adjusted easily in a short period time. Therefore, the maintenance and running costs involved in the adjusting work can be reduced.

Also, in the relationship with the regulation holder 180, the adjuster 190 is formed so as to be capable of adjusting the compression amount of the compression spring 160 in a multistage manner according to the relative rotation angle with respect to the regulation holder 180, so that the compression amount of the compression spring 160 can be adjusted in a multistage manner merely by relatively turning the adjuster 190 through a predetermined angle with respect to the regulation holder 180. Therefore, as compared with the conventional case of simple screwing, the compression amount (conveying force) can be adjusted as desired with ease and high accuracy, and further with high accuracy without the occurrence of variations among the plurality of rollers 120.

Next, the work for compulsorily fixing the roller 120 to the sprocket 110 (the cylindrical part 111) so that the roller 120 rotates integrally with the sprocket 110 is explained with reference to FIG. 16.

First, the lid 105 closing the adjustment hole 104 of the unit frame 110 is removed. Successively, the fixing bolt B is brought close to the unit frame 100 from the outside of the axis direction A, and the shank B1 and the head B2 thereof are caused to pass through the adjustment hole 104 of the unit frame 100 and the through hole 181 of the regulation holder 180. Only the shank B1 of the bolt B is caused to pass through the through hole 191 of the adjuster 190 while the head B2 of the bolt B is brought into contact with the adjuster 190, and the screwing tool T2 is connected to the head B2 to turn the bolt B, by which the external threads formed in the tip end region of the shank B1 is screwed in the internal threads 119 of the sprocket 110.

The bolt B is screwed in to a position at which the engagement protrusions 194 of the adjuster 190 separate from the concave parts 183 of the regulation holder 180. Then, the compression spring 160 is further compressed exceeding the range of adjustment due to the rotation of the adjuster 190, so that the roller 120 is fixed compulsorily to the sprocket 110 so as not to produce relative rotation between the roller 120 and the sprocket 110 (the cylindrical part 111).

Figure 17:
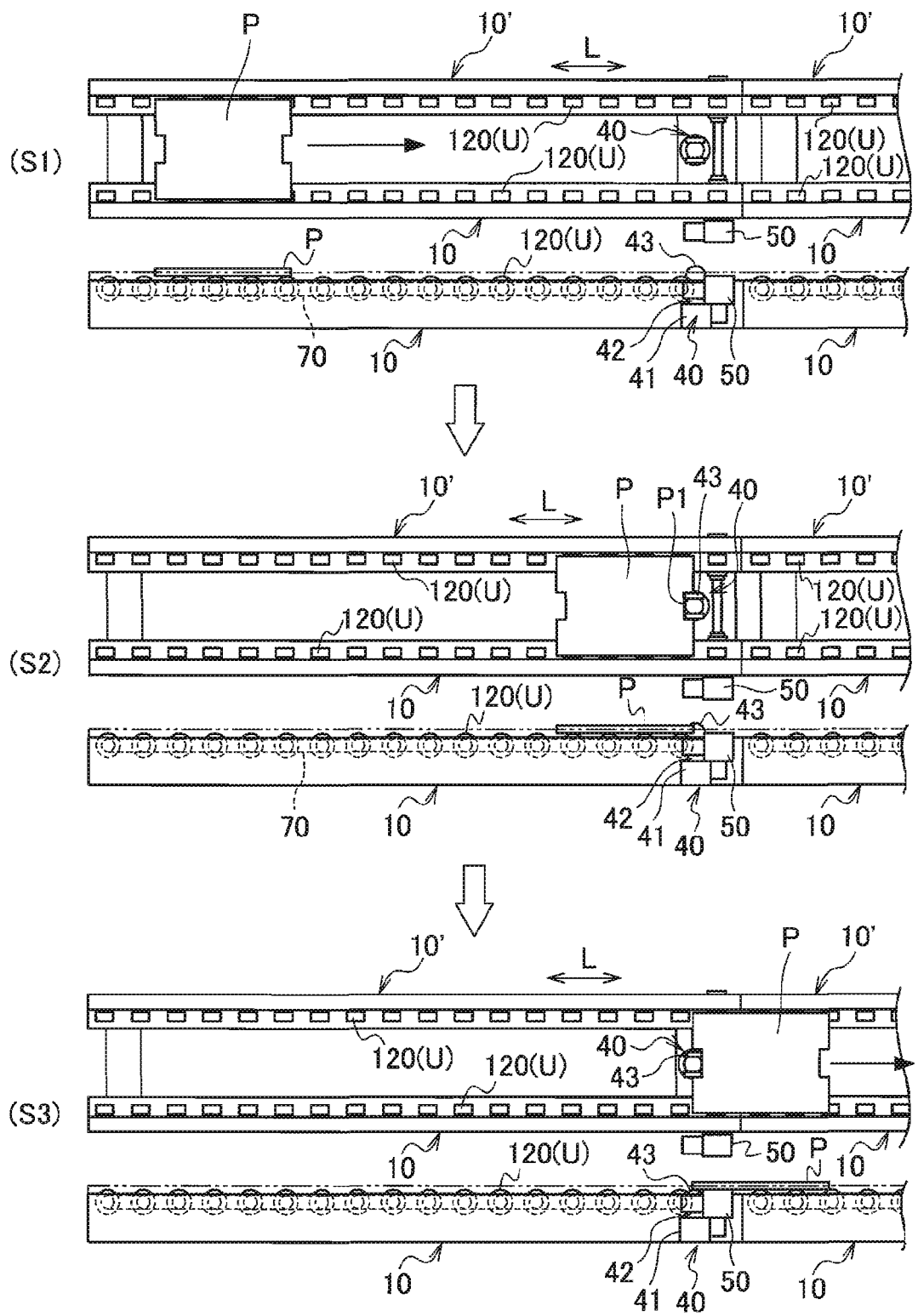
FIG. 17 is an operation view for explaining conveying operation of a conveyor device in accordance with the present invention.

Next, the conveying operation of conveyor device and the adjustment of conveying force are explained with reference to FIG. 17. In this explanation, the conveying force of the roller unit U has been set at a predetermined amount beforehand by the pressing force adjusting mechanism.

First, the pallet P is set on the rollers 120, and the driving source 50 is started to rotate the plurality of rollers 120 (S1).

At this time, the state in which the pallet P is conveyed is checked. When the conveying force generated by the roller 120 is weak (or when the conveying force varies among the rollers 120 though the variations do not occur basically in the present invention), the adjuster 190 is turned appropriately by using the tool T1 as described above to adjust the conveying force to a desired amount.

In this adjusting work, the adjuster 190 can be turned to a desired angular position while the marks Ma, Mb, Mc and Md on the tool T1 are checked. Therefore, the adjustment can be made easily and surely in a short period of time. Also, the adjustment can be made with high accuracy so that variations in conveying force do not occur among the plurality of rollers 120.

When the pallet P is conveyed to the downstream side in the conveyance direction L and abuts on the stopper member 43 of the stopper mechanism 40, it is checked whether or not the rollers 120 that carry the pallet P stop by means of the load applied by the pallet P (S2). If the rotation of the rollers 120 does not stop, the conveying force is too strong, so that the adjuster 190 is turned appropriately by using the tool T1 as described above to adjust the conveying force to a desired amount.

Thus, when the pallet P stops and stays, by stopping the rollers 120 that carry the pallet P, rubbing of the roller 120 against the pallet P can be prevented, and therefore the formation of abrasion powder or the like can be prevented.

Successively, the stopper member 43 is lowered by driving the stopper mechanism 40, by which the staying pallet P begins to be conveyed toward the downstream side (S3).

At this time, in order for the pallet P to be conveyed surely, the conveying force of the plurality of rollers 120 included in a predetermined region arranged on the downstream side from the stopper mechanism 40 may be set so as to be one step higher than other rollers 120. Even in the case where the conveying force is set at a different amount in a necessary location, by merely turning the adjuster 190 appropriately by using the tool T1 as described above, the adjusting work can be performed easily and surely in a short period of time.

Also, in the case where a plurality of conveyor devices are connectedly arranged, the conveying force of the rollers 120 near the connecting location may differ slightly depending on the connecting state. If the pallet P moves on such rollers 120, the conveyance is not accomplished smoothly. In this case as well, by setting the conveying force of the rollers 120 arranged in this region so as to be one step higher as described above, the pallet P can be conveyed steadily and smoothly.

Figure 18:
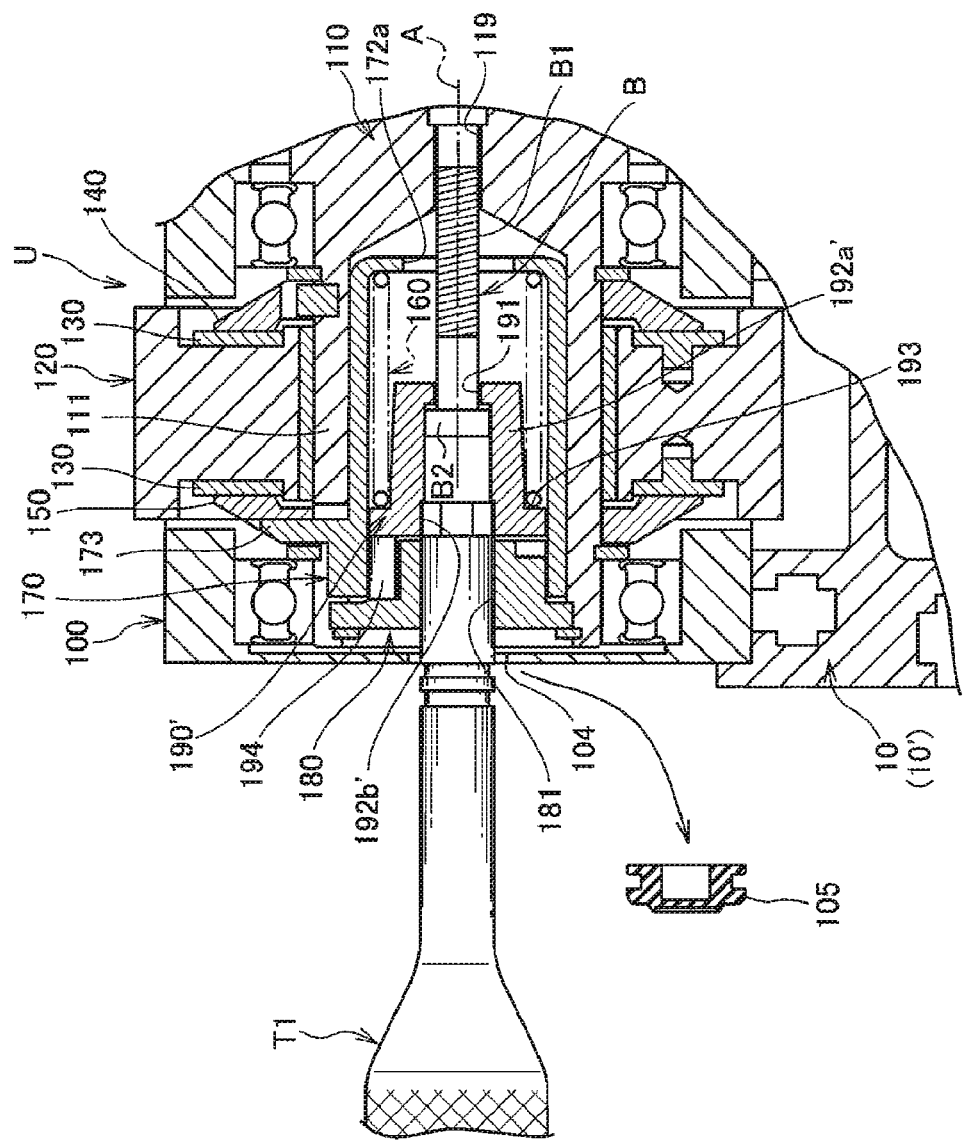
FIG. 18 is a partial sectional view of a conveyor device, showing another embodiment of a roller unit in accordance with the present invention.

FIGS. 18 and 19 show another embodiment of the roller unit in accordance with the present invention.

This embodiment is the same as the above-described embodiment except that the adjuster, which is a part of the pressing force adjusting mechanism, is changed. Therefore, the same symbols are applied to the same elements, and the explanation thereof is omitted.

In this roller unit U, as shown in FIGS. 18 and 19, an adjuster 190' includes the circular through hole 191 penetrating in the axis direction A; a cylindrical part 192a' for receiving the head B2 of the bolt B; a hexagonal connecting hole 192b' formed coaxially with the through hole 191 on the outside of the axis direction A of the cylindrical part 192a' to connect the tip end of the tool T1; the annular receiving part 193 for receiving the other end of the compression spring 160; and the three engagement protrusions 194 formed at equal intervals (120-degree intervals) in the circumferential direction so as to project in the direction facing to the regulation holder 180 (outward in the axis direction A).

The through hole 191 is formed so as to have a size such that the head B2 of the bolt B is not allowed to pass through and only the shank B1 thereof is allowed to pass through.

The cylindrical part 192a' is formed so as to receive the head B2 of the bolt B so that the bolt B can be moved relatively in the axis direction A and to have a bottom wall that defines the through hole 191, and makes the through hole 191 be positioned at a position separating from the connecting hole 192b' through a predetermined distance to the inside of the axis direction A. That is to say, the through hole 191 is formed at a position separating from the connecting hole 192b' through a predetermined distance to the inside of the axis direction A.

The predetermined distance is a distance through which the adjuster 190' can move in the axis direction A for adjustment in the state in which (the shank B1 of) the bolt B is threadedly assembled to the internal threads 119 beforehand so that the head B2 does not come into contact with the bottom wall of the cylindrical part 192a'.

According to this embodiment, as shown in FIG. 18, in the state in which the bolt B that fixes the roller 120 compulsorily to the sprocket 110 has been assembled beforehand in a state of not fixing compulsorily, (the tip end of) the adjusting tool T1 is brought close to the unit frame 100 from the outside of the axis direction A, and is insertedly connected to the connecting hole 192b' of the adjuster 190'. Thereafter, the tool T1 is turned appropriately or pushed in through a predetermined length and turned, and then is pulled out, by which the adjuster 190' can be adjusted easily.

On the other hand, when the roller 120 is fixed compulsorily to the sprocket 110, as shown in FIG. 19, merely by further screwing the bolt B having been assembled beforehand by using the screwing tool T2, the work for fixing the roller 120 can be completed.

Therefore, in the fixing work, the work for assembling the bolt B is unnecessary, so that the fixing work can be performed easily and simply.

In the above-described embodiment, the sprocket 110, serving as a rotating body, having the cylindrical part 111 and the endless chain 70, serving as a power transmitting member, for transmitting power to the plurality of roller units U have been shown. However, the configuration is not limited to this. For example, a pulley having a cylindrical part, serving as a rotating body, and a belt wound around the pulley, serving as a power transmitting member, may be employed.

In the above-described embodiment, the case where three roller units U are incorporated in the unit frame 100 has been shown. However, the configuration is not limited to this, and two roller units U or four or more roller units U may be incorporated.

In the above-described embodiment, the case where the unit frame 100 is used has been shown. However, the configuration is not limited to this, and the roller units U may be incorporated directly in the conveyor frames 10, 10'.

In the above-described embodiment, the case where the compression spring 160, the spring holder 170, the regulation holder 180, and the adjuster 190, 190' are used as the pressure regulating mechanism has been shown. However, any other mechanism may be used if the mechanism is arranged inside the cylindrical part 111 formed integrally with the rotating body (the sprocket 110). Also, the case where the contact pieces 173 are extended from the spring holder 170 and are fitted into the receiving grooves 173 of the second thrust plate 150 has been shown. However, the configuration is not limited to this. If mechanical rigidity is secured, the configuration may be used in which the second thrust plate is provided with a plurality of extending pieces that go into the side of the cylindrical part 111 through the slits 115, and the plurality of extending pieces are pressed by a part of the spring holder.

INDUSTRIAL APPLICABILITY

As described above, the roller unit and the conveyor device in accordance with the present invention can adjust the conveying force (rotational force) of the roller easily and surely while attaining simplification of the structure, reduction in the size and the running and maintenance costs, and the like. Therefore, the roller unit and the conveyor device can be used in the field of manufacturing electronic parts or mechanical parts, and also they are useful in other fields in which other parts and products are handled.

The invention claimed is:

1. A roller unit for forming a roller-type conveyor device in which rollers are arranged continuously on a conveyor frame, comprising:
   a rotating body that has a cylindrical part rotatably supported about a predetermined axis and is rotationally driven, the axis extending in an axial direction;
   a roller having an outer peripheral surface and two side surfaces, the roller being rotatably supported about the axis by an outer periphery of the cylindrical part to carry an object being conveyed on the outer peripheral surface of the roller, the side surfaces being at opposite ends of the roller in the axial direction;
   a pair of thrust plates that are arranged so as to be capable of pressing both side surfaces of the roller in the axial direction while holding the roller therebetween, and so as to rotate integrally with the cylindrical part; and
   a pressing force adjusting mechanism that is arranged inside the cylindrical part to adjust a pressing force with which the pair of thrust plates press the roller while holding the roller therebetween.

2. The roller unit as set forth in claim 1, wherein the pressing force adjusting mechanism comprises:
   a compression spring arranged in a state of being compressible in the axial direction;
   a spring holder having a receiving part for receiving one end of the compression spring in a contacting state and a contact piece being in contact with one of the pair of thrust plates from an outside of the axial direction;
   a regulation holder that is arranged on the other end side of the compression spring in the axial direction and is fixed to an inside of the cylindrical part; and
   an adjuster that is arranged so as to be interposed between the compression spring and the regulation holder to adjust a compression amount of the compression spring by a rotational operation thereof from the outside of the axial direction.

3. The roller unit as set forth in claim 2, wherein the adjuster is formed so as to be capable of adjusting the compression amount of the compression spring in a multistage manner according to a relative rotation angle with respect to the regulation holder.

4. The roller unit as set forth in claim 2, wherein the contact piece is provided in plural numbers at equal intervals in a circumferential direction so as to project in a radial direction with respect to the axis, and one of the pair of thrust plates is provided with a plurality of receiving grooves for receiving the plurality of contact pieces from the outside of the axial direction.

5. The roller unit as set forth in claim 2, wherein the rotating body is provided with internal threads in the axial direction,
   the regulation holder is provided with a through hole that allows a head and a shank of a bolt threadedly engaging with the internal threads to pass through,
   the adjuster is provided with a through hole that allows only the shank of the bolt to pass through, and
   the receiving part of the spring holder is provided with a through hole that allows at least the shank of the bolt to pass through.

6. The roller unit as set forth in claim 5, wherein the adjuster has a connecting hole for insertingly connecting an adjusting tool from the outside of the axial direction, and a through hole that allows only the shank of the bolt to pass through at a position separating from the connecting hole by a predetermined distance toward an inside in the axial direction.

7. The roller unit as set forth in claim 1, wherein a cylindrical bush that rotates integrally with the roller and transmits a rotational force of the rotating body by means of a frictional force is provided between the cylindrical part of the rotating body and the roller.

8. A conveyor device comprising:
   a pair of conveyor frames extending in a direction in which an object being conveyed is conveyed;
   a plurality of roller units arranged along the pair of conveyor frames;
   a driving source for giving a driving force to at least one of the plurality of roller units; and
   a power transmitting member for transmitting the driving force of the driving source to the plurality of roller units, wherein
   each roller unit includes
      a rotating body that has a cylindrical part rotatably supported about a predetermined axis and is rotationally driven, the axis extending in an axial direction,
      a roller having an outer peripheral surface and two side surfaces, the roller being rotatably supported about the axis by an outer periphery of the cylindrical part to carry an object being conveyed on the outer peripheral surface of the roller, the side surfaces being at opposite ends of the roller in the axial direction,
      a pair of thrust plates that are arranged so as to be capable of pressing both side surfaces of the roller in the axial direction while holding the roller therebetween, and so as to rotate integrally with the cylindrical part, and
      a pressing force adjusting mechanism that is arranged inside the cylindrical part to adjust a pressing force with which the pair of thrust plates press the roller while holding the roller therebetween.

9. The conveyor device as set forth in claim 8, wherein the conveyor device has a unit frame that incorporates the plurality of roller units by dividing the roller units into a predetermined number, and
   the unit frame is arranged along the pair of conveyor frames and is installed detachably.

10. The conveyor device as set forth in claim 8, wherein the pressing force adjusting mechanism comprises:
   a compression spring arranged in a state of being compressible in the axial direction;
   a spring holder having a receiving part for receiving one end of the compression spring in a contacting state and a contact piece being in contact with one of the pair of thrust plates from an outside of the axial direction;
   a regulation holder that is arranged on the other end side of the compression spring in the axial direction and is fixed to an inside of the cylindrical part; and
   an adjuster that is arranged so as to be interposed between the compression spring and the regulation holder to adjust a compression amount of the compression spring by a rotational operation thereof from the outside of the axial direction.

11. The conveyor device as set forth in claim 10, wherein the adjuster is formed so as to be capable of adjusting the compression amount of the compression spring in a multistage manner according to a relative rotation angle with respect to the regulation holder.

12. The conveyor device as set forth in claim 10, wherein the contact piece is provided in plural numbers at equal intervals in a circumferential direction so as to project in a radial direction with respect to the axis, and one of the pair of thrust plates is provided with a plurality of receiving grooves for receiving the plurality of contact pieces from the outside of the axial direction.

13. The conveyor device as set forth in claim 10, wherein the rotating body is provided with internal threads in the axial direction, the regulation holder is provided with a through hole that allows a head and a shank of a bolt threadedly engaging with the internal threads to pass through, the adjuster is provided with a through hole that allows only the shank of the bolt to pass through, and the receiving part of the spring holder is provided with a through hole that allows at least the shank of the bolt to pass through.

14. The conveyor device as set forth in claim 13, wherein the adjuster has a connecting hole for insertingly connecting an adjusting tool from the outside of the axial direction, and a through hole that allows only the shank of the bolt to pass through at a position separating from the connecting hole by a predetermined distance toward an inside in the axial direction.

15. The conveyor device as set forth in claim 8, wherein a cylindrical bush that rotates integrally with the roller and transmits a rotational force of the rotating body by means of a frictional force is provided between the cylindrical part of the rotating body and the roller.

\* \* \* \* \*